United States Patent
Couture et al.

(10) Patent No.: US 12,062,112 B1
(45) Date of Patent: Aug. 13, 2024

(54) APPARATUS FOR HETEROGENOUS PROCESSING

(71) Applicant: Parry Labs, LLC, Alexandria, VA (US)

(72) Inventors: Marc Couture, Alexandria, VA (US); Michael Palmer, Alexandria, VA (US)

(73) Assignee: Parry Labs, LLC, Alexandria, VA (US)

(*) Notice: Subject to any disclaimer, the term of this patent is extended or adjusted under 35 U.S.C. 154(b) by 0 days.

(21) Appl. No.: 18/422,122

(22) Filed: Jan. 25, 2024

(51) Int. Cl.
G06T 1/20 (2006.01)
G06T 1/60 (2006.01)

(52) U.S. Cl.
CPC . G06T 1/20 (2013.01); G06T 1/60 (2013.01)

(58) Field of Classification Search
CPC .................. G06T 1/20; G06T 1/60
USPC ............. 345/501, 536, 537, 538
See application file for complete search history.

(56) References Cited

U.S. PATENT DOCUMENTS

| | | | |
|---|---|---|---|
| 8,233,527 B2* | 7/2012 | Schmit | H04N 19/61 375/240 |
| 9,203,855 B1 | 12/2015 | Mooring et al. | |
| 9,438,844 B2 | 9/2016 | Camer et al. | |
| 10,699,003 B2 | 6/2020 | Zamir et al. | |
| 11,016,793 B2 | 5/2021 | Tsirkin | |
| 11,475,140 B1 | 10/2022 | Buonora | |
| 11,789,711 B2* | 10/2023 | Facory | G06F 8/427 717/140 |
| 11,789,764 B2 | 10/2023 | Vidyadhara et al. | |
| 2014/0055467 A1* | 2/2014 | Bittner | G06F 3/14 345/520 |
| 2016/0055612 A1* | 2/2016 | Barik | G06F 3/14 345/522 |
| 2020/0202251 A1* | 6/2020 | Dobrovolsky | G06F 9/5044 |
| 2022/0342710 A1* | 10/2022 | Vishnuswaroop Ramesh | G06F 9/5016 |
| 2023/0026505 A1 | 1/2023 | Lee et al. | |
| 2023/0092214 A1 | 3/2023 | Wu et al. | |

FOREIGN PATENT DOCUMENTS

| | | |
|---|---|---|
| CN | 203561933 U | 4/2014 |
| CN | 105721780 A | 6/2016 |
| TW | 1585612 B | 6/2017 |

(Continued)

OTHER PUBLICATIONS

Hosseinabady et al; Heterogeneous FPGA+GPU Embedded Systems: Challenges and Opportunities; arXiv:1901.06331v2 [cs. DC] Jan. 25, 2019.

(Continued)

*Primary Examiner* — Jacinta M Crawford
(74) *Attorney, Agent, or Firm* — Caldwell Intellectual Property Law

(57) ABSTRACT

A system on a chip may include a GPU, a CPU, a dedicated memory for the CPU, an FPGA, a dedicated memory for the FPGA, a control and data bus assembly connecting the FPGA, the CPU, and the GPU, wherein the FPGA, the CPU, and the GPU are configured to interact using the control and data bus assembly and an API configured to allow the same code to run on the FPGA, the CPU, and the GPU, a VPX, a first HSIO connection connecting the GPU to the VPX, a second HSIO connection connecting the CPU to the VPX, and a third HSIO connection connecting the FPGA to the VPX.

20 Claims, 7 Drawing Sheets

(56) References Cited

FOREIGN PATENT DOCUMENTS

WO     2014031459 A1     2/2014
WO     2016102055 A2     6/2016

OTHER PUBLICATIONS

Rodriguez et al; Parallel multiprocessing and scheduling on the heterogeneous Xeon+FPGA platform; The Journal of Supercomputing vol. 76, pp. 4645-4665 (2020).

C Zhang et al; High-Performance and Energy-Efficient FPGA-GPU-CPU Heterogeneous System Implementation; Proceedings from PDPTA'20, CSC'20, MSV'20, and GCC'20; p. No. 477-492, Oct. 2021.

Lozano et al; A Comprehensive Survey on the Use of Hypervisors in Safety-Critical Systems; Received Mar. 9, 2023, accepted Mar. 29, 2023, date of publication Apr. 5, 2023, date of current version Apr. 14, 2023. Digital Object Identifier 10.1109/ACCESS.2023.3264825.

Zhang et al; Virtualization Airborne Trusted General Computing Technology; Appl. Sci. 2023, 13(3) Published: Jan. 19, 2023.

* cited by examiner

APPARATUS FOR HETEROGENOUS PROCESSING

FIELD OF THE INVENTION

The present invention generally relates to the field of computer architecture. In particular, the present invention is directed to an apparatus for heterogenous processing.

BACKGROUND

While current techniques allow for software to utilize specific processor architectures, processors of other architectures may remain unused or underutilized. Additionally, utilization of processor cores by multiple programs may slow operation of mission critical programs.

SUMMARY OF THE DISCLOSURE

In an aspect, a hardware apparatus for heterogenous processing may include a graphics processing unit comprising a first dedicated memory and a first plurality of processing cores; a central processing unit comprising a second dedicated memory and a second plurality of processing cores; a field programmable gate array comprising a third dedicated memory; a control and data bus assembly connecting the field programmable gate array, the central processing unit, and the graphics processing unit, wherein the field programmable gate array, the central processing unit, and the graphics processing unit are configured to interact using the control and data bus assembly and an application program interface configured to allow the same code to run on the field programmable gate array, the central processing unit, and the graphics processing unit; a virtual path cross-connect interface component; a first high speed input output connection connecting the graphics processing unit to the virtual path cross-connect interface component; a second high speed input output connection connecting the central processing unit to the virtual path cross-connect interface component; and a third high speed input output connection connecting the field programmable gate array to virtual path cross-connect interface component; wherein the hardware apparatus is configured to receive a program instruction set; and allocate a first processing core from the first plurality of processing cores and a second processing core from the second plurality of processing cores to the program instruction set.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for heterogenous processing. Apparatus may include a GPU, a CPU, a dedicated memory for the CPU, an FPGA, which may have a dedicated memory, a control and data bus assembly, a VPX, and one or more HSIO connections. In embodiments, apparatus may be connected to computing systems and/or local networks thereof to add processing power, support for secure operation of third-party applications, connections to peripherals, and the like. Apparatus may serve as a module in a modular computing system suitable for deployment in aircraft, land vehicles, command centers, and/or communication nodes in the field.

Figure 1:
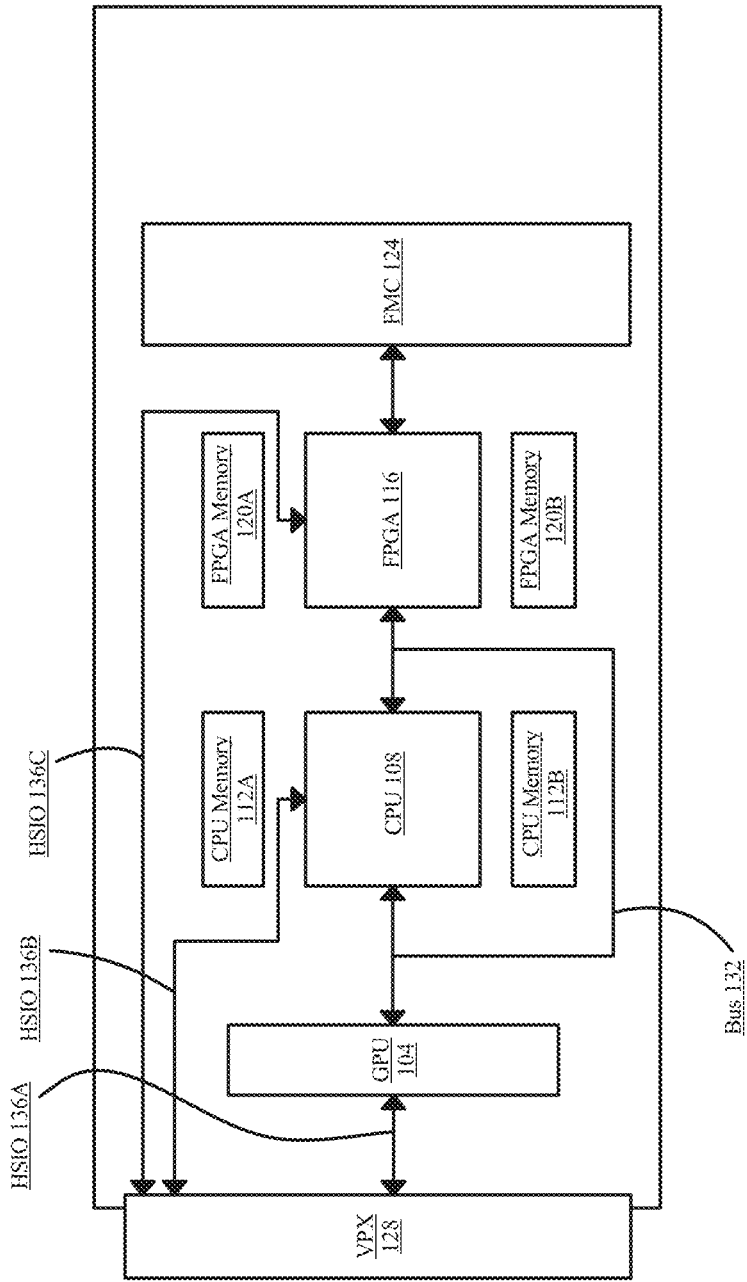
FIG. 1 is a diagram depicting an exemplary apparatus for heterogenous processing.

Referring now to FIG. 1, an exemplary embodiment of an apparatus 100 is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include software instructions in memory and/or may receive software instructions from an external computing device. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Still referring to FIG. 1, in some embodiments, apparatus 100 may include a Graphics Processing Unit (GPU) 104. GPU 104 may include a type of computer chip often used for graphics related tasks such as 3D rendering. In some embodiments, GPU 104 may contain more, smaller, and more specialized cores than a typical CPU, allowing it to run larger sets of functions at once. In addition to 3D rendering, GPU 104 may also be used for other functions, such as those in which operations must be performed on large matrices of data. In non-limiting examples, GPU 104 may have applications in cryptography and machine learning.

Still referring to FIG. 1, in some embodiments, apparatus 100 may include a plurality of streaming multiprocessors, an L2 cache, and/or a DRAM. In some embodiments, each streaming multiprocessor may include one or more instruction schedulers and instruction execution pipelines. In some embodiments, a GPU may group threads into thread blocks and may execute such thread blocks. In some embodiments, dependent instruction latency may be mitigated by switching to execution of other threads.

Still referring to FIG. 1, a processor such as GPU 104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; a processor may be organized according to Von Neumann and/or Harvard architecture as a non-limiting example. A processor may include, incorporate, and/or be incorporated in, without limitation, a microcontroller, microprocessor, digital signal processor (DSP), FPGA, Complex Programmable Logic Device (CPLD), GPU, CPU, Tensor Processing Unit (TPU), analog or mixed signal processor, Trusted Platform Module (TPM), a floating point unit (FPU), system on module (SOM), and/or system on a chip (SoC).

Still referring to FIG. 1, in some embodiments, GPU 104 may use a system on a module (SoM) design. In some embodiments, a SOM GPU may include NVIDIA Jetson NX or Google Coral. In some embodiments, a GPU may use a Chip Down Design.

Still referring to FIG. 1, in some embodiments, apparatus 100 may include a GPU dedicated memory. A dedicated memory may be physically closer to GPU 104 and may be configured for fast and/or efficient access by GPU 104. In some embodiments, a dedicated memory for GPU 104 may include persistent memory. In some embodiments, a dedicated memory for GPU 104 may include temporary memory. In some embodiments, inclusion of a dedicated memory for GPU 104 may improve the efficiency of apparatus 100 in comparison to retrieval of information from a general purpose memory. Optionally, a dedicated memory for GPU 104 may include 72 bit DDR4 memory. In some embodiments, GPU dedicated memory may be accessible only by GPU 104. In some embodiments, GPU dedicated memory may be accessible by GPU 104, CPU 108, and/or FPGA 116.

Still referring to FIG. 1, software run on apparatus 100 may include a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Still referring to FIG. 1, in some embodiments, apparatus 100 may include Central Processing Unit (CPU) 108. CPU 108 may include a general purpose computer processor. CPU 108 may include a Reduced Instruction Set Computer (RISC) processor. In some embodiments, RISC processors may include less complicated functions than a Complex Instruction Set Computer (CISC). In some embodiments, this may allow individual instructions to be performed more quickly on a RISC processor than a CISC processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozen of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory 112A and/or 112B may be accessed through LOAD i.e., to load a memory location and STORE i.e., to write to it, wherein all other instructions may operate on one or more processor registers and processor 108 may not have direct access to manipulate memory 112A and/or 112B. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory 112A and/or 112B, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like. Exemplary embodiments of CPUs are described in further detail below with reference to FIG. 2.

Still referring to FIG. 1, in some embodiments, apparatus 100 may include CPU dedicated memory, such as CPU dedicated memory 112A and 112B. In some embodiments, CPU dedicated memory 112A and/or 112B may include persistent memory. In some embodiments, CPU dedicated memory 112A and/or 112B may include temporary memory. In some embodiments, inclusion of CPU dedicated memory 112A and/or 112B may improve the efficiency of apparatus 100 in comparison to retrieval of information from a general purpose memory. In some embodiments, CPU dedicated memory 112A and/or 112B may include ECC memory. In some embodiments, CPU dedicated memory 112A and/or 112B may include 72 bit DDR4 memory. In some embodiments, CPU dedicated memory 112A and/or 112B may be accessible only by CPU 108. In some embodiments, CPU dedicated memory 112A and/or 112B may be accessible by GPU 104, CPU 108, and/or FPGA 116.

Still referring to FIG. 1, in some embodiments, apparatus 100 may include Field Programmable Gate Array (FPGA) 116. FPGA 116 may include a chip that may be programmed and/or reprogrammed after manufacturing. FPGA 116 may include a series of registers and logic gates. In some embodiments, FPGA 116 registers may be turned on and off in order to program FPGA 116. This may be used to, for example, run a specific algorithm many times using hardware rather than software instructions. In some embodiments, once configured, FPGA 116 may perform processing functions much faster than software instruction solutions. In some embodiments, FPGA 116 may include a KINTEX UltraSCALE FPGA. In some embodiments, FPGA 116 may include an Intel Agilex 7 FPGA F-Series.

Still referring to FIG. 1, in some embodiments, apparatus 100 may include an FPGA dedicated memory, such as FPGA dedicated memory 120A and 120B. In some embodiments, FPGA dedicated memory 120A and/or 120B may include persistent memory. In some embodiments, FPGA dedicated memory 120A and/or 120B may include temporary memory. In some embodiments, inclusion of FPGA dedicated memory 120A and/or 120B may improve the efficiency of apparatus 100 in comparison to retrieval of information from a general purpose memory. In some embodiments, FPGA dedicated memory 120A and/or 120B may include ECC memory. In some embodiments, FPGA dedicated memory 120A and/or 120B may include 72 bit DDR4 memory. In some embodiments, FPGA dedicated memory 120A and/or 120B may be accessible only by FPGA 116. In some embodiments, FPGA dedicated memory 120A and/or 120B may be accessible by GPU 104, CPU 108, and/or FPGA 116.

Still referring to FIG. 1, in some embodiments, apparatus 100 may include FPGA Mezzanine Card (FMC) 124. In some embodiments, FMC 124 may be used to transfer data in and/or out of FPGA 116. In some embodiments, FMC 124 may connect to an external computing device. In a non-limiting example, apparatus 100 may receive instructions and/or other data through FMC 124. In another non-limiting example, apparatus 100 may output data through FMC 124. FMC 124 may conform to FMC standards.

Still referring to FIG. 1, in some embodiments, apparatus 100 may include Virtual Path Cross-Connect (VPX) module 128. VPX module 128 may conform to VPX standards. VPX module 128 may be used for input and/or output of signals from apparatus 100. VPX module 128 may be communicatively connected to an external computing device and/or an external component of a computing device. VPX module 128 may include a 3U VPX. VPX module 128 may include a 6U VPX.

Still referring to FIG. 1, apparatus 100 may include a processor and a memory that communicate with each other, and with other components, via a bus. A bus may include any of several types of bus structures including, but not limited to, a memory bus, a memory controller, a peripheral bus, a local bus, and any combinations thereof, using any of a variety of bus architectures.

Still referring to FIG. 1, in some embodiments, apparatus 100 may include control and data bus assembly 132. Control and data bus assembly 132 may connect GPU 104, CPU 108, and/or FPGA 116. Components connected by control and data bus assembly 132 may communicate using an API configured to enable the division of processing tasks between the FPGA, the CPU, and the GPU. In some embodiments, an API may allow code to run on varying hardware, such as GPU 104, CPU 108, and/or FPGA 116, rather than being limited to a particular hardware architecture. In some embodiments, different computing tasks may be performed more efficiently on different architectures. For example, a first computing task may be performed more efficiently on GPU 104, a second computing task may be performed more efficiently on CPU 108, and a third computing task may be performed more efficiently on FPGA 116. In another example, a computing task may have multiple components which may be split between GPU 104, CPU 108, and FPGA 116 such that all available processing power is used. In some embodiments, inclusion of GPU 104, CPU 108, and FPGA 116, and division of computing tasks between them, may provide improvements to speed and/or efficiency of apparatus 100.

Still referring to FIG. 1, in some embodiments, GPU 104, CPU 108, and/or FPGA 116 may be configured such that they are capable of running code specific to their architecture. This capability may be in addition to API based programming.

Still referring to FIG. 1, in some embodiments, apparatus 100 may include one or more High Speed Input/Output (HSIO) connections, such as HSIO connections 136A, 136B, and 136C. In some embodiments, HSIO connection 136A may connect GPU 104 with VPX 128. In some embodiments, HSIO connection 136B may connect CPU 108 with VPX 128. In some embodiments, HSIO connection 136C may connect FPGA 116 with VPX 128.

Still referring to FIG. 1, apparatus 100 may include one or more additional memory components. Memory may include various components (e.g., machine-readable media) including, but not limited to, a random-access memory component, a read only component, and any combinations thereof. In one example, a basic input/output system (BIOS), including basic routines that help to transfer information between elements within a computer system, such as during start-up, may be stored in memory. A memory may also include (e.g., stored on one or more machine-readable media) instructions (e.g., software) embodying any one or more of the aspects and/or methodologies of the present disclosure. In another example, memory may further include any number of program modules including, but not limited to, an operating system, one or more application programs, other program modules, program data, and any combinations thereof.

Still referring to FIG. 1, apparatus 100 may also include a storage device. Examples of a storage device include, but are not limited to, a hard disk drive, a magnetic disk drive, an optical disc drive in combination with an optical medium, a solid-state memory device, and any combinations thereof. A storage device may be connected to a bus by an appropriate interface. Example interfaces include, but are not limited to, SCSI, advanced technology attachment (ATA), serial ATA, universal serial bus (USB), IEEE 1394 (FIRE-WIRE), and any combinations thereof. In one example, a storage device (or one or more components thereof) may be removably interfaced with apparatus 100 (e.g., via an external port connector). Particularly, a storage device and an associated machine-readable medium may provide nonvolatile and/or volatile storage of machine-readable instructions, data structures, program modules, and/or other data for apparatus 100. In one example, software may reside, completely or partially, within machine-readable medium. In another example, software may reside, completely or partially, within a processor.

Still referring to FIG. 1, in some embodiments, apparatus 100 may be communicatively connected to an external computing device and/or a component of an external computing device. In some embodiments, apparatus 100 may provide additional computing power to an external computing device. In some embodiments, apparatus 100 may be used to tasks in signal processing, communication, machine learning, graphics rendering, cryptography, and the like.

Still referring to FIG. 1, in some embodiments, one or more applications may be run on apparatus 100. In some embodiments, one or more applications may be run on apparatus 100 using the same operating system. For example, all applications of a plurality of applications may run using the same operating system. In some embodiments, virtual machines and/or partitions may be used to separate processing power and/or memory of apparatus 100. In some embodiments, one or more applications may be isolated from one or more other applications through the use of partitions and/or virtual machines. In some embodiments, separation of applications may prevent them from interfering with each other, for example, by one application using excessive amounts of processing power, causing another application to run more slowly. In some embodiments, separation of applications may prevent applications from making full use of available resources such as memory or processing power.

Still referring to FIG. 1, in some embodiments, one or more mission critical applications may run on apparatus 100. Apparatus 100 may be configured such that applications may be prioritized, and memory and/or processor cores may be allocated as a function of this prioritization. In some embodiments, an application may be deemed mission critical and/or high priority and may have greater access to memory and/or processor cores based on this categorization. For example, an amount of processor cores and/or memory necessary to complete a task within certain parameters (such as within a certain time frame) may be estimated for an application. One or more such estimates may be made. For example, a first estimate designed to have the highest probability of accuracy may be made, and a second estimate designed to represent a worst case scenario of resource usage may be made. In this example, a low priority application may be allocated memory and/or processor cores based on a first estimate, while a high priority application may be allocated memory and/or processor cores based on a second estimate. In some embodiments, which processor cores are allocated to which application may be determined as a function of application priority. For example, if a high priority application and a low priority application both run optimally using CPU cores, then available CPU cores may be allocated to the high priority application before the low priority application. In some embodiments, apparatus 100 may be configured such that a low priority application may be moved off of a processor core in order to make room for a high priority application.

Still referring to FIG. 1, in some embodiments, multi-threading, multiprocessing, and/or symmetric multiprocessing may be used to improve processing times. In some embodiments, multithreading may allow multiple threads to be executed on a processor core concurrently. Multiprocessing may involve the use of multiple processing cores to perform a computing task. Symmetric multiprocessing may include the use of multiple processor cores to perform a single task, where the cores utilize the same memory and operating system. A plurality of identical cores may be used in symmetric multiprocessing. For example, multiple GPU cores may be used in a symmetric multiprocessing task. In another example, multiple CPU cores may be used in a symmetric multiprocessing task.

Still referring to FIG. 1, in some embodiments, multiple processing cores may be allocated to implementing a single program instruction set. In some embodiments, GPU cores and CPU cores may both be used to implement a single program instruction set. This may be enabled, for example, by an API described herein. In a non-limiting example, a GPU may include a first plurality of cores, a CPU may include a second plurality of cores, apparatus 100 may receive a program instruction set, and apparatus 100 may allocate a first core from the first plurality of cores and a second core from the second plurality of cores to the program instruction set. In some embodiments, such a program instruction set may be stored in local memory. In some embodiments, such a program instruction set may be received from an external device. In some embodiments, apparatus 100 may be partitioned such that such a program instruction set operates on a separate partition from other programs. In some embodiments, apparatus 100 may run a virtual environment and/or operating system on a set of cores and memory allocated to program instruction set. In some embodiments, cores and/or memory allocated to program instruction set may be connected selectively through an FGPA. This may prevent, for example, access of memory allocated to program instruction set by a nonsecure program.

Still referring to FIG. 1, in some embodiments, apparatus 100 may be configured to initiate a secure boot process when apparatus 100 and/or a computing device communicatively connected to apparatus 100 is powered on or restarted. In some cases, apparatus 100 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, apparatus 100 may include a plurality of TPMs, each contain an RSA key pair known as "Endorsement key (EK)," wherein the RSA key pair may be maintained inside of a TPM and cannot be accessed by non-secure software. In some cases, a first partition may include a bootloader (i.e., the first piece of software that runs). In some cases, bootloader may be verified, for example, one or more apparatus 100 firmware may be configured to check bootloader's digital signature before execution using keys e.g., public keys stored in TPM or another secure component. In case where bootloader's signature doesn't match, apparatus 100 may halt, preventing potential malicious partitions from running. Once bootloader is verified and executed, a hypervisor may be instantiated. In some cases, a hypervisor may also be verified through an associated digital signature to ensure its authenticity. In a non-limiting example, apparatus 100 may boot only with trusted and authenticated partitions e.g., a primary partition and plurality of child partitions. Child partitions may be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, apparatus 100 may be configured to boot into a safe mode, attempting to restore a trusted software version, or simply halting a processor and/or primary partition to prevent potential threats.

Still referring to FIG. 1, in some embodiments, data stored on apparatus 100 may be protected by one or more security measures. Security measures may include, in non-limiting examples, storage in a database, password protection, multi factor authentication, hashing, encryption, digital signatures, inclusion in a blockchain, and the like. Cryptographic systems and blockchain are described further herein.

Still referring to FIG. 1, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Still referring to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Still referring to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still referring to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

Still referring to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, datum may include a time-varying datum, which may have a time limit after which time-varying datum is no longer valid. Time limit may be calculated from an initial time, which may be a datum linked to a particular timestamp or other value representing a fixed moment in time, associated with time-varying datum; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, a step may include performing a trusted time evaluation of a variable by a processor. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a datum is an authentic datum that has the property of attested time. Generating a secure timestamp may be used to weed out spoofers or "man in the middle attacks."

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using datum. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. [data], along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, a data store or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Figure 2:
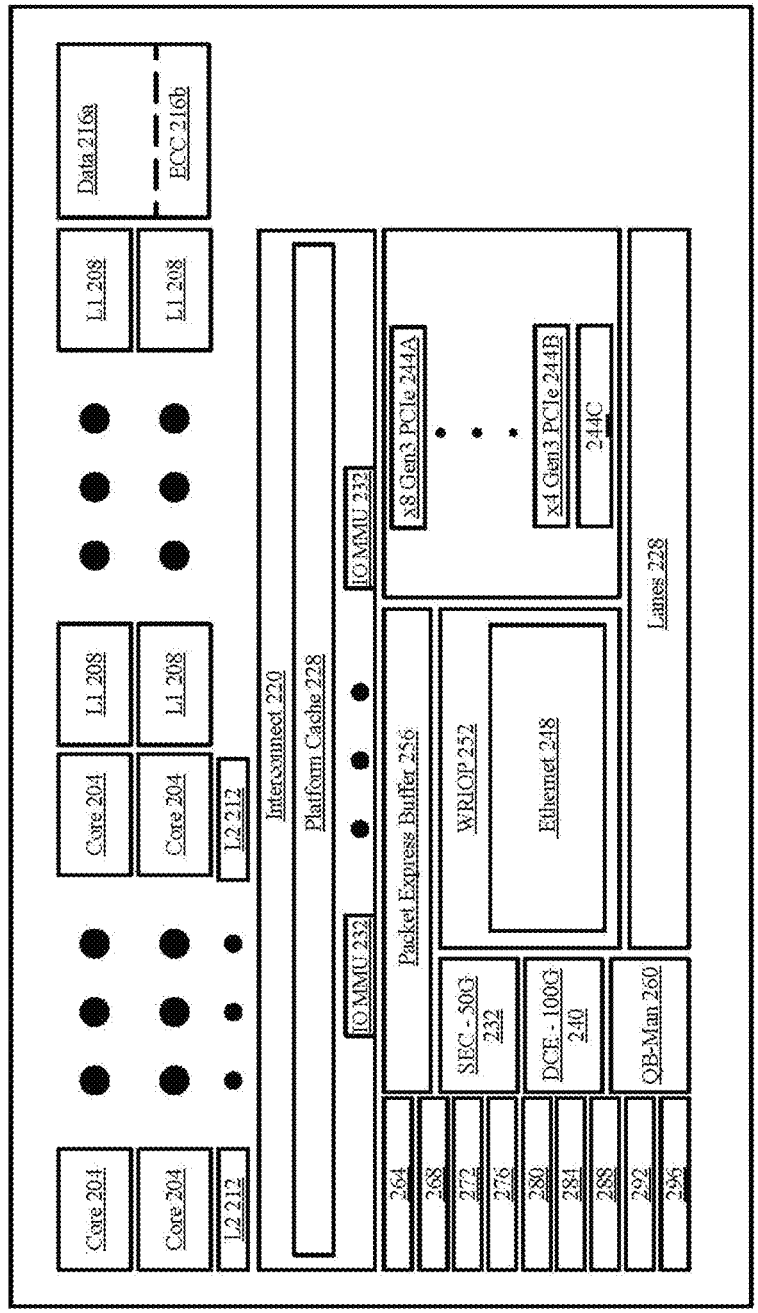
FIG. 2 is a diagram depicting an exemplary CPU.

Now referring to FIG. 2, in some embodiments, CPU 200 may include a standalone processor, or may be integrated into a processor with one or more GPU cores, such as without limitation as implemented in a system like a JETSEN as implemented by Nvidia Corporation of Santa Clara, CA. CPU 200 may include 8, 12, or 16 or more CPU cores 204. CPU cores 204 may run at any suitable clock speed, such as 0.5 to 3 GHZ. CPU 200 may include 18 MB cache/on-chip memory. CPU 200 may include one or more L1 caches 208, which may each be connected to and/or integrated into a core 204 and/or may be shared by two or more cores; L1 caches may be structured in any suitable manner, and may include, without limitation, 8 MB of memory, 4 MB of memory, or any suitable amount. CPU 200 may include one or more L2 caches 212; L2 caches 212 may be connected to L1 caches and/or structured therewith in any suitable manner, and may each have any suitable amount of memory, including without limitation 8 MB, 6 MB, or the like. CPU 200 may include one or more primary and/or random-access memory (RAM) elements 216a-b, each of which may include a plurality of data storage elements 216a, defined as elements dedicated to storing bits of data in any suitable format, such as in bytes, 32-bit words, 63-bit words, or the like. Primary memory may alternatively or additionally include one or more elements of ECC memory 216b, defined as memory dedicated for use in error correction codes (ECC) for detection and/or correction of error; such memory may include, without limitation, 8 or more bits per 64-bit word, 4 or more bits per 32-bit word, 1 or more bits per byte, or the like. Primary memory 216a-b may be implemented in any suitable manner such as using DDR4 or the like, and may have 100 or more GB of capacity. In some embodiments, CPU 200 may be configured such that information is retrieved from memory based on speed of information recovery from the memory. For example, CPU 200 may be configured such that an L1 cache is checked for relevant information first, then an L2 cache may be checked for relevant information, then operating memory such as DDR4 memory may be checked for relevant information. CPU 200 may include interconnect 220, a platform cache 224, which may have any suitable capacity such as without limitation 8 MB or more, and/or IO MMU 228. CPU 200 may include a plurality of Serializer/Deserializer (SerDes) lanes such as without limitation 24 or more such lanes, which may operate at any suitable clock speed such as without limitation 25 GHz. Such lanes may include one or more PCIe and/or PCIe Gen3 lanes 232 per SerDes lane, which may each, as a non-limiting example, support ×8 ports. CPU 200 may include a security accelerator 236, which may operate at a data rate of 50 Gbps or more. CPU 200 may include a data compression/decompression engine 240, which may operate, in a non-limiting example, at 100 Gbps or more. CPU 200 may comply with any suitable security and/or trusted computing standard, such as without limitation an ARM SystemReady ES standard. CPU 200 may include one or more PCIE and/or Gen3 PCIe 244A-B. CPU 200 may include one or more SATA PCIe cards 244C. CPU 200 may include a 10 MB plat cache+PEB. CPU 200 may include WRIOP 25 of 16 simultaneous MACs; combos of up to 16×1GE, 10×1/2.5/10GE, 6×25GE, and/or 2×40/ 50/100GE; and/or L2 switching up to 114 Gbps. CPU 200 may include 8, 12, or 16 any suitable number of Ethernet ports 252. CPU 200 may support any suitable Ethernet speeds including without limitation 1, 2.5, 10, 25, 40, 50, and 100 gigabits per second. CPU 200 may include a 114 Gbps Layer 2 Ethernet switch. CPU 200 may include a packet express buffer 256, which may have any size such as without limitation 2 or more MB. CPU 200 may include QB-Man 260. CPU 200 may include secure boot system 264. CPU 200 may include secure resource component 268. Secure resource component 268 may include one or more resources which are hardware separated. Secure resource component 268 may prevent non-secure software from accessing secure resources. Secure resource component 268 may include ARM TrustZone. CPU 200 may include power management system 272. CPU 200 may include SD/cMMC 276. CPU 200 may include 2×DUART 280. CPU 200 may include 8×I2C 284. CPU 200 may include SPI, GPIO, JTAG 288. CPU 200 may include 2×USB3.0+PHY 290. CPU 200 may include 2×CAN-FD 296.

Still referring to FIG. 2, in some embodiments, DDR4 may include persistent memory. 72 bit DDR4 may store 72 bit words. Similarly, CPU cores 204 may include 72 bit word memory. 72 bit words may include 64 bit words and error correction code (ECC) memory. ECC memory may be used to verify data stored in memory and/or identify errors in data stored in memory. Use of ECCs may include encoding of a message or lot of data using redundant information, permitting recovery of corrupted data. An ECC may include a block code, in which information is encoded on fixed-size packets and/or blocks of data elements such as symbols of predetermined size, bits, or the like. An ECC may include Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bosc-Chaudhuri, Hocquenghuem (BCH) coding, multidimensional parity-check coding, and/or Hamming codes. An ECC may alternatively or additionally be based on a convolutional code. Use of ECCs may enable a datum to be scanned, read, evaluated, and/or verified.

Figure 3:
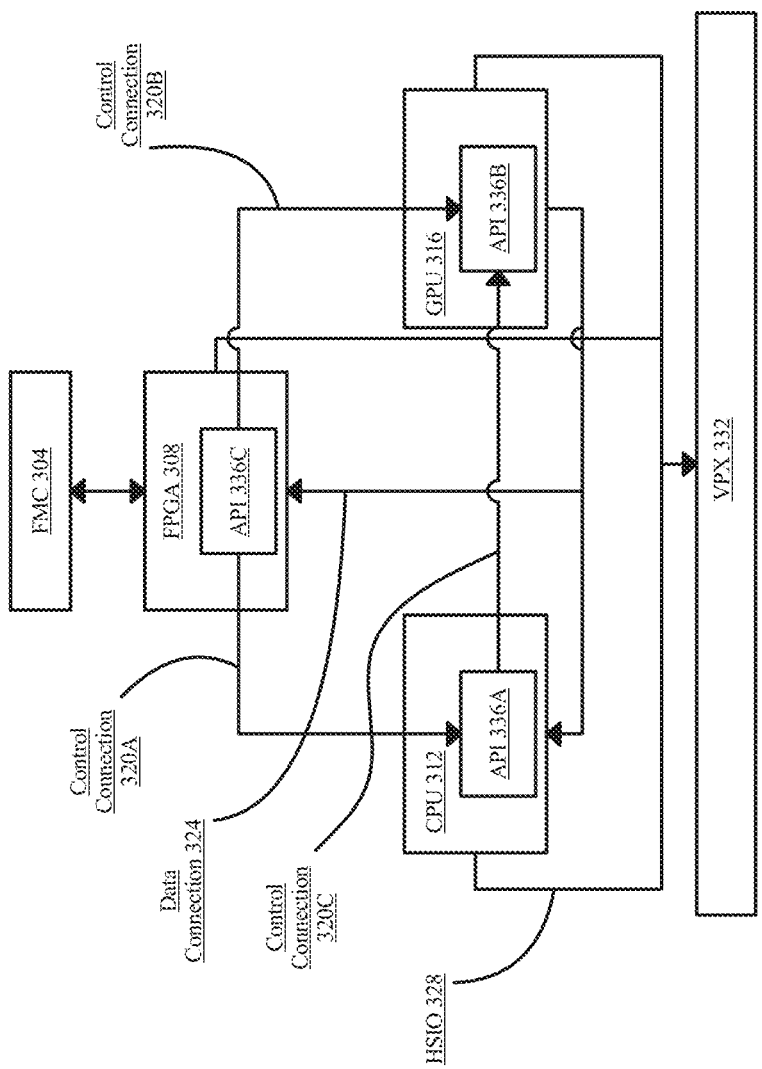
FIG. 3 is a diagram depicting an exemplary apparatus for heterogenous processing including an API.

Now referring to FIG. 3, an exemplary embodiment of apparatus 300 is provided. Apparatus 300 may include FMC 304 communicatively connected to FPGA 308. Apparatus 300 may also include CPU 312, GPU 316, and control connections between FPGA 308, CPU 312 and/or GPU 316. Such control connections may include control connection 320A from FPGA 308 to CPU 312, control connection 320B from FPGA 308 to GPU 316, and/or control connection 320C from CPU 312 to GPU 316. Apparatus 300 may also include data connection 324 from GPU 316 to CPU 312 and/or FPGA 308. Apparatus 300 may also include HSIO connection 328. HSIO connection 328 may transfer data between VPX 332, CPU 312, FPGA 308, and/or GPU 316. In some embodiments, CPU 312 may include API 336A, GPU 316 may include API 336B, and FPGA 308 may include API 336C. In some embodiments, APIs 336A, 336B, and 336C may each accept the same inputs. In some embodiments, APIs 336A, 336B, and 336C may each be used to interpret code using the APIs such that they may be executed on hardware to which the processing task is assigned.

Figure 4:
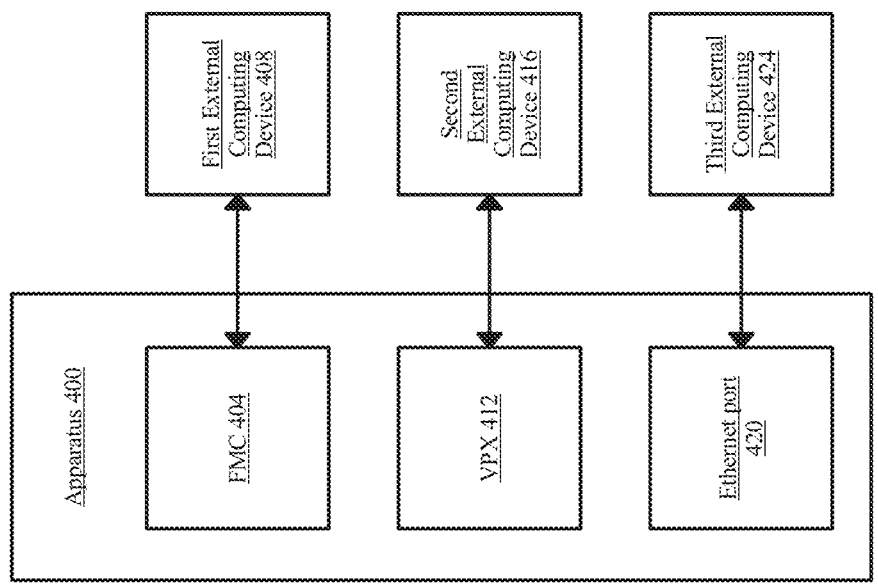
FIG. 4 is a diagram depicting an exemplary apparatus for heterogenous processing and associated external devices.

Referring now to FIG. 4, an exemplary embodiment of apparatus 400 and associated devices is illustrated. Apparatus 400 may be communicatively connected to one or more external computing devices. For example, apparatus 400 may include FMC 404 and FMC 404 may be communicatively connected to first external computing device 408. In a non-limiting example, apparatus 400 may include a slave device in a master slave arrangement, where first external computing device 408 includes a master device. For example, apparatus 400 may be configured to perform operations as directed by first external computing device 408. Apparatus 400 may include VPX 412 and VPX 412 may be communicatively connected to second external computing device 416. Second external computing device 416 may include, in a non-limiting example, a user interface. A user interface may include a display. VPX 412 may be connected to an external device which splits a connection towards multiple other devices. For example, a first connection may transmit display data and may go to a monitor, and a second connection may include other data and may go toward a USB port. Apparatus 400 may include one or more ethernet ports 420. For example, apparatus 400 may include 1, 2, 3, 4, 5, 6, 7, 8, 9, 10, or more ethernet ports. Ethernet ports may be used to make communicative connections with additional computing devices such as third external computing device 424.

Still referring to FIG. 4, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 4, apparatus 400 may include one or more input devices. In one example, a user of a computer system including apparatus 400 may enter commands and/or other information into the computer system via an input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. An input device may be interfaced to a bus via any of a variety of interfaces including, but not limited to, a serial interface, a parallel interface, a game port, a USB interface, a FIREWIRE interface, a direct interface to a bus, and any combinations thereof. An input device may include a touch screen interface that may be a part of or separate from a display. An input device may be utilized as a user selection device for selecting one or more graphical representations in a graphical interface as described above.

Still referring to FIG. 4, a user may also input commands and/or other information to apparatus 400 via a storage device (e.g., a removable disk drive, a flash drive, etc.) and/or a network interface device. A network interface device may be utilized for connecting apparatus 400 to one or more of a variety of networks and one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from apparatus 400 via a network interface device.

Still referring to FIG. 4, a computer system may further include a video display adapter for communicating a displayable image to a display device. Examples of a display device include, but are not limited to, a liquid crystal display (LCD), a cathode ray tube (CRT), a plasma display, a light emitting diode (LED) display, and any combinations thereof. A display adapter and display device may be utilized in combination with a processor to provide graphical representations of aspects of the present disclosure. In addition to a display device, a system including apparatus 400 may include one or more other peripheral output devices including, but not limited to, an audio speaker, a printer, and any combinations thereof. Such peripheral output devices may be connected to a bus via a peripheral interface. Examples of a peripheral interface include, but are not limited to, a serial port, a USB connection, a FIREWIRE connection, a parallel connection, and any combinations thereof.

Figure 5:
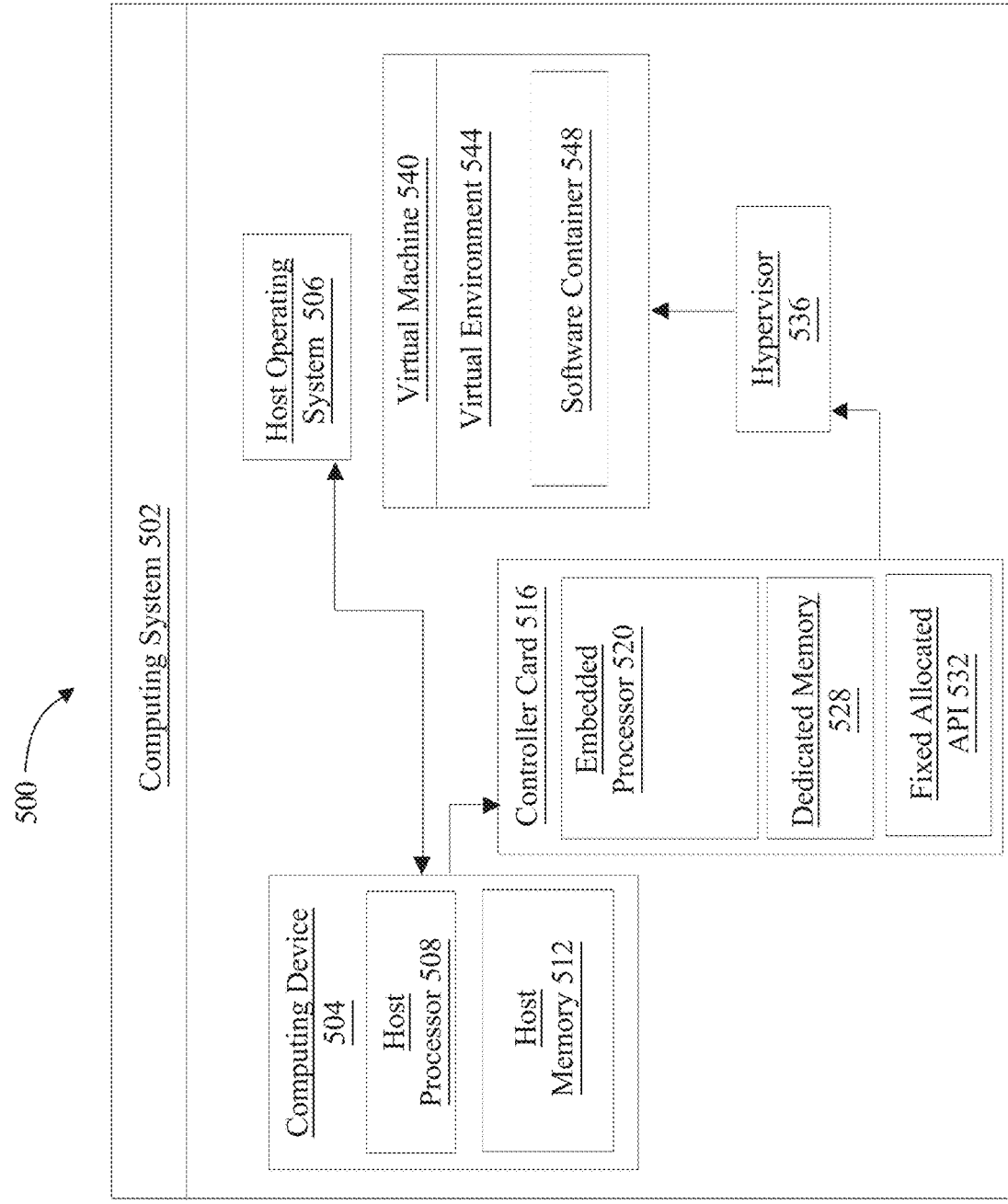
FIG. 5 is a diagram depicting an exemplary system for isolated virtual environments.

Referring now to FIG. 5, a system 500 for isolated virtual environments is described. System 500 may include computing system 502. Computing system 502 may include computing device 504. "Computing system" for the purposes of this disclosure refers to a computing device containing one or more additional hardware components. For example, and without limitation, computing system 502 may include computing device with an additional graphics card. In one or more embodiments, computing system 502 may include a computing device 504 that has been modified to allow for increased storage space, increased processing power, increased network capabilities and the like. In one or more embodiments, computing system 502 may include a processor 508. Processor 508 may include, without limitation, any processor 508 described in this disclosure. Processor 508 may be included in a and/or consistent with computing device 504. In one or more embodiments, processor 508 may include a multi-core processor. In one or more embodiments, multi-core processor may include multiple processor cores and/or individual processing units. In one or more embodiments, each processor core within multi-core processor may function independently. In one or more embodiments, each processor core within multi-core processor may perform functions in parallel with other processor cores. In one or more embodiments, multi-core processor may allow for a dedicated processor core for each program and/or software running on a computing device. In one or more embodiments, multiple cores may be used for a singular function and/or multiple functions. In one or more embodiments, multi-core processor may allow for a computing device to perform differing functions in parallel. In one or more embodiments, processor 508 may include a plurality of multi-core processors.

With continued reference to FIG. 5, memory 512 may include a primary memory and a secondary memory. "Primary memory" also known as "random access memory" (RAM) for the purposes of this disclosure is a short-term storage device in which information is processed. In one or more embodiments, during use of computing device 504, instructions and/or information may be transmitted to primary memory wherein information may be processed. In one or more embodiments, information may only be populated within primary memory while a particular software is running. In one or more embodiments, information within primary memory is wiped and/or removed after computing device 504 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 508 may access the information from primary memory.

With continued reference to FIG. 5, processor 508 may include a host processor. "Host processor" for the purposes of this disclosure is a general-purpose processor located on computing device that is configured to manage operating system of computing device. Host processor may be configured to carry out functions of the operating system of computing device whereas other processors communicatively connected toc computing system 502 may be given differing and/or distinct functions. In one or more embodiments, memory 512 may include a host memory. "Host memory" for the purposes of this disclosure is a memory containing instructions and/or information from the operating system on computing device. In one or more embodiments, host memory may be dedicated to host processor wherein instructions on host memory 512 may be carried out by host processor. In one or more embodiment host memory and/or host processor may be included within host circuit as described in further detail below. In one or more embodiments, host memory may contain instructions configuring host processor to manage other memory and/or processors on and/or connected to computing device 504.

With continued reference to FIG. 5, system 500 may include a host circuit. Host circuit may include at least a processor 508 and/or host processor communicatively connected to a memory 512 and/or host memory. As used in this disclosure, a "host circuit" is an integrated circuit or a collection of interconnected circuits designed to manage, control, and/or interface with one or more functionalities in a system 500. In a non-limiting example, host circuit may be configured as a primary platform or base that provides essential infrastructure, resources, and interfaces to facilitate the operation of other connected or integrated components. Hosting circuit may include any computing device 504 as described in this disclosure, including without limitation a microcontroller, microprocessor 508, digital signal processor 508 (DSP) and/or system 500 on a chip (SoC) that provide one or more services, resources, or data to other computing devices. Host circuit may include, be included in, and/or communicate with a mobile device such as a mobile telephone or smartphone. Host circuit may include a single computing device 504 operating independently or may include two or more computing device 504 operating in concert, in parallel, sequentially or the like; two or more computing devices may be included together in a single computing device 504 or in two or more computing devices. In some cases, host circuit may include but is not limited to, for example, a computing device 504 or cluster of computing devices in a first location and a second computing device 504 or cluster of computing devices in a second location. In other cases, host circuit may include a main unit or a primary circuit in a network that controls communications and/or provide a central point of interface.

With continued reference to FIG. 5, computing device 504 may include a host operating system 506. In one or more embodiments, host circuit may provide the hardware to allow for host operating system 506. Host operating system may include any host operating system 506 as described in this disclosure. In one or more embodiments, one or more software and/or applications as described in this disclosure may be initialized by host operating system 506. In one or more embodiments, host operating system 506 may include the primary operating system of computing system 502. In one or more embodiments, one or more operating systems may be run on computing system 502 through one or more virtualization processes wherein host operating system 506 may include the primary operating system. In one or more embodiments, host operating system 506 may be configured to manage the one or more virtualization processes as described in further detail below. In one or more embodiments, virtual machines, virtual environments and the like may be accessed by host operating system 506 as described in further detail below.

With continued reference to FIG. 5, computing system 502 may include a controller card 516. "Controller card" for the purposes of this disclosure is a separate hardware component that may be connected to computing device 504 in order to provide additional or improved computing capabilities. For example, and without limitation, controller card 516 may allow for increased network bandwidth, increased processing power, increased memory, increased storage space, network connectivity, additional input ports and the like. In another non limiting example, controller card 516 may include a GPU. A GPU may include a processor configured to calculate and process visual information on computing device. In one or more embodiments, controller card 516 may include, but is not limited to, a hard drive controller card 516, an internal seria ATA (SATA) card, and external SATA (CSATA), a graphics card, an audio card, a network interface card, a Bluetooth card, a modem card, a CPU card and the like. In one or more embodiments, controller card 516 may provide for additional or improved computing capabilities. In one or more embodiments, controller card 516 may be connected to computing device through one or more peripheral component interconnect express (PCIe) slots on computing device. In one or more embodiments, computing device may contain one or more PCIe slots wherein each slot may be configured to receive and communicate with a separate controller card 516. PCIe slots may allow for a high-speed interface between computing device and one or more controller cards 516. In one or more embodiments, PCIe may allow for increased data transfer rates between computing device and controller card 516. In one or more embodiments, PCIe slot may accommodate various PCIe generations such as PCIe 3.0, PCIe 4.0, PCIe 5.0 and/or PCIe 6.0 wherein a PCIe with a higher generation may contain a larger bandwidth per lane. For example and without limitation, PCIe 3.0 may contain a data transfer rate of 8 Gbps (gigabytes per second) per lane whereas PCIe 5.0 may provide for a data transfer rate of 32 Gbps per lane. In one or more embodiments differing PCIe slots may contain one or more lanes wherein each lane may provide for a particular data transfer rate between PCIe slot and computing device. For example, and without limitation, a PCIe with 16 lanes may provide double the data transfer rate as a PCIe with 8 lanes. In one or more embodiments, the number of lanes a particular PCIe slot may contain may be denoted as 'x1' wherein the numerical digit following the 'x' may indicate the number of lanes. For example, a PCIe×16 may contain 16 lanes. In one or more embodiments, the number of lanes for a particular PCIe may depend on controller card 516. For example, and without limitation, a network controller card 516 may not require a large data transfer rate and therefore may utilize a PCIe slot with less lanes. In one or more embodiments, differing PCIe slots may provide differing power outputs wherein a PCIe×1 slot may receive less power than a PCIe×16 slot. In one or more embodiments, controller card 516 may be communicatively connected and/or physically connected to computing device through PCIe slot. In one or more embodiments, controller card 516 may be fixedly and/or removably attached to a motherboard of computing device.

With continued reference to FIG. 5, in one or more embodiments, controller card 516 may include one or more processors as described in this disclosure. In one or more embodiments, controller card 516 and/or the processors on controller card 516 may include one or more embedded processors 520. "Embedded processor" for the purpose of this disclosure is a processing component that has been designated for a specific task in a larger computing environment. For example, and without limitation, embedded processor 520 may include a processor configured to transform analog signals into digital signals, a processor for automotive systems, control systems and the like. In one or more embodiments, embedded processor 520 may be separate and distinct from processor 508. In one or more embodiments, processor 508 may be referred to as a host processor and the embedded processes as the child processor wherein the host processor is configured to perform various computing functions for the computing device, while the child processor is given a particular function. In one or more embodiments, embedded processor 520 may contain any type of processing device such as but not limited to a central processing unit (CPU), a graphical processing unit (GPU), a field programmable gate array (FPGA), a micro controller, a reduced instruction set computer (RISC) processor, a complex instruction set computer (CISC), an ARM processor, an AI accelerator and the like. In one or more embodiments, controller card 516 may contain one or more embedded processors 520 and/or a plurality of embedded processors 520. In one or more embodiments, the one or more embedded processors 520 may differ from one another. For example, and without limitation, a first embedded processor 520 may include a CPU whereas a second Embedded processor may include a GPU. In one or more embodiments embedded processors 520 on controller card 516 may include a plurality of heterogenous processing components. "Heterogenous processing components" for the purposes of this disclosure are processors having differing structures and/or cores from one another. For example, and without limitation, heterogenous processing components may include a GPU and CPU. In one or more embodiments, heterogenous processing components may include differing processor cores wherein a first CPU may contain 6 processor cores whereas a second CPU may contain 8 processor cores. In one or more embodiments, heterogenous processing components may be configured to differing tasks, functions and the like. In one or more embodiments a structure having heterogenous processing components may allow for increased computational efficiency wherein each embedded processor 520 may excel at differing processes. For example, and without limitation, a CPU may be efficient at running operating systems and inefficient at processing images whereas a GPU may be more efficient at processing images. In one or more embodiments, a collection of heterogenous processing components may allow for increased diversity between processing components wherein processors may be selected based on their capability to perform a particular task or function. In one or more embodiments, a system of heterogenous processing components may allow for increased isolation wherein a first embedded processor 520 may contain increased isolation between a second embedded processor 520.

With continued reference to FIG. 5, controller card 516 may contain a dedicated memory. Dedicated memory may include a memory that is configured exclusively for a particular processor or embedded processor. For example, and without limitation, dedicated memory may include a physical hardware device that is used exclusively for a particular processor. Continuing the example, a GPU may contain a dedicated memory wherein the dedicated memory may contain a video random access memory (VRAM). In one or more embodiments, VRAM may be dedicated to GPU wherein data generated and/or carried out by GPU may be stored in VRAM. In one or more embodiments, each embedded processor 520 may contain dedicated memory wherein dedicated memory may be configured to carry out tasks exclusively for each embedded processor 520. In one or more embodiments, controller card 516 may contain a plurality of dedicated memory cards wherein each memory card may differ from one another. For example, and without limitation dedicated memory may include VRAM wherein VRAM may include a memory that has been dedicated for graphics processing. In one or more embodiments, VRAM may contain graphics memory chips that allow for high-speed data transfer and parallel processing. In one or more embodiments, VRAM may be optimized for graphical processing wherein VRAM may obtain increased read and write writes in comparison to conventional memory. In one or more embodiments, VRAM may be configured for particular functions such as image and video processing. In one or more embodiments, dedicated memory may further include random access memory (RAM) or system RAM. In one or more embodiments, System RAM may be configured to allow for a wide range of functions. In contrast to VRAM, system ram may be configured to process graphical images as well as other functions. In one or more embodiments, system RAM may sacrifice performance for reliability and multitasking capabilities. For example and without limitation, while a system RAM may process images at a slower rate, the system RAM may be configured for a wide variety of applications. In one or more embodiments, dedicated memory may include a Block RAM, wherein the block RAM is a memory configured for FPGAs. In one or more embodiments, dedicated memory may include Block RAM, ultra-RAM, configuration memory, distributed RAM, and the like. In one or more plurality of dedicated memory may include plurality of heterogenous memory components wherein each dedicated memory may differ from one another. For example, and without limitation, a first dedicated memory may include VRAM, whereas a second dedicated memory may include block RAM. In one or more embodiments, heterogeneous memory components may allow for increased isolation between two or more processing components. In one or more embodiments, differing dedicated memory components may allow for memory components that are configured exclusively to allow for a processor to run more efficiently. In one or more embodiments, differing dedicated memory components may allow for prevention of direct memory access (DMA) wherein a particular software running on a first memory may not interfere with a particular software running on a second memory. In one or more embodiments, dedicated memory may include differing bandwidths such as DDR1, DDR2, DDR3, DDR4 and/or DDR5. In one or more embodiments, in instances in which two dedicated memory may be similar, controller card 516 may contain differing bandwidths wherein a first dedicated memory may include DDR4, and a second dedicated memory may contain DDR4. In one or more embodiments, a memory having a lower bandwidth may not communicate with a memory having a higher bandwidth. In one or more embodiments, each dedicated memory may contain differing storage space. In one or more embodiments, each embedded processor 520 may contain its own dedicated memory wherein the dedicated memory is not partitioned and shared between more than one processors. In one or more embodiments, it may be desirable to partition one dedicated memory while leaving other dedicated memory alone. For example, and without limitation, a software that is safety critical may run on a singular embedded processor 520 and corresponding dedicated memory wherein other software that are not as critical with respect to safety may allocate processor cores of a single embedded processor 520 and allocate partitions of the dedicated memory to various virtual environments. In one or more embodiments, dedicated memory may include primary memory and/or secondary memory. In one or more embodiments, several physical secondary components may exist on controller card 516 wherein each embedded processor 520 and dedicated primary memory may be communicatively connected to the physical secondary memory. In one or more embodiments, a single physical secondary memory component may exist wherein the single secondary memory may be partitioned. In one or more embodiments, each partition may be allocated to an embedded processor 520 and dedicated memory 528 pair.

With continued reference to FIG. 5, controller card 516 may include a boot operating storage solution (BOSS) card. "Boot operating storage solution card" for the purposes of this disclosure is a specialized controller card 516 configured to improve the boot times on a computing device. In one or more embodiments, BOSS card may contain a primary memory and secondary memory that operates faster than the host memory. In one or more embodiments, BOSS card may include flash memory herein the flash memory may allow for quicker boot times. In one or more embodiments, BOOS CARD may store the operating system of computing device wherein the operating system may be stored and run a separate memory. In one or more embodiments, BOSS cards may contain dedicated boot partition wherein the operating system may be stored on a separate partition of the storage device to allow for faster access and quicker boot times. In one or more embodiments, Boss card may include one or more embedded processors 520 dedicated to booting up an operating system on computing device. In one or more embodiments, computing system 502 may contain a plurality of BOSS cards, wherein each BOSS card may be connected to a differing PCIe slot. In one or more embodiments, each BOSS card may be configured for a differing operating system and/or differing virtual environment as described in further detail below.

In one or more embodiments, controller card 516 may include a Virtual cross path (VPX) controller card 516. A VPX controller card may include a controller card that has met the standards and/or limitations of the VMEbus International Trade Association (VITA). VPX standards may include standards such as but not limited to, specific size requirements, various high spend requirements. In one or more embodiments, VPX components may adhere to one of two form factors: a 3U form factor wherein the component must have a maximum width of 100 millimeters (mm) and a 6U form factor wherein the component must contain a maximum width of 160 mm. In one or more embodiments VPX controller card 516 may include a controller card 516 having a maximum width of 100 millimeters. In one or more embodiments, VPX controller card 516 may include a maximum width of 160 millimeters. In one or more embodiments, VPX controller card 516 may include a 3U VPX controller card 516 wherein the controller card 516 contains a maximum width of 100 mm and a maximum length of 160 mm. In one or more embodiments, VPX controller card 516 may contain a MultiGig RT2 connector or a MultiGig RT3 connector. In one or more embodiments, VPX components may follow an OpenVPX standard (VITA 66 and/or VITA 67) as established by the VMEbus International Trade Association. In one or more embodiments, VPX components such as, but not limited to VPX controller card 516 may contain temperature range requirements wherein the component must be able to operate between temperature of −40 degrees Celsius to 80 degrees Celsius. In one or more embodiments, VPX component may support high speed fabric interconnects in the range of 10 gbps to 100 gbps. In one or more embodiments, VPX component may contain secure boot software, tamper detection software and/or encrypted software. In one or more embodiments, VPX controller card 516 may be encrypted. In one or more embodiments, VPX controller card 516 may contain a secure boot software. In one or more embodiments, VPX controller card 516 may contain components that have been VPX certified and/or components that adhere to VPX standards. For example, and without limitation, embedded processors 520 may include a VPX embedded processor 520 wherein the embedded processor 520 may adhere to VPX standards.

With continued reference to FIG. 5, in one or more embodiments, controller card 516 may contain driver software. "Driver software" for the purposes of this disclosure is software that allows a component to communicate with a computing device. For example, and without limitation, controller card 516 may contain driver software that allows computing device to communicate with controller card 516. In one or more embodiments, driver software may include software that allows an individual to access various capabilities of the controller card 516. For example, and without limitation, driver software may allow an individual to access the boot menu of a components, access various information about the hardware and the like. In one or more embodiments, controller card 516, computing system 502 and/or computing device may contain driver software that allows for allocation of one or more components on controller card 516 to be isolated.

With continued reference to FIG. 5, in one or more embodiments, controller card 516 may be encrypted, password protected and the like. In one or more embodiments, controller card 516 may contain one or more authentication mechanisms wherein a password, particular user and the like may be required to allow access to controller card 516. In one or more embodiments, controller card 516 may be encrypted in any way as described in this disclosure. In one or more embodiments, data stored on controller card 516 may be encrypted. In one or more embodiments, data stored in a memory of controller card 516 may be encrypted. In one or more embodiments, data transferred from controller card 516 to computing device, such as to host operating system 506 may be encrypted wherein a decryption key may be needed to decrypt the information. In one or more embodiments, authorized users who have access to decryption key may be able to decrypt information within controller card 516. In one or more embodiments, controller card 516 may be configured to initiate a secure boot process as described above.

With continued reference to FIG. 5, controller card 516 may include a field replaceable unit (FRU). "Field replaceable unit" for the purposes of this disclosure is a hardware component that is removably attached to a computing device. In one or more embodiments, FRU may include push buttons, levers, switches the like to facilitate removal of FRU from computing device. In one or more embodiments, FRU may include a component that is accessible without undue burden, such as through the removal of screws, unsoldering and the like. In one or more embodiments, FRU may communicate with computing device through PCIe slot wherein PCIe slot may allow for removal and insertion of an FRU such as controller card 516. In one or more embodiments, controller card 516 may be portable wherein controller card 516 may be removed from a first device and placed within a second device.

Still referring to FIG. 5, in some embodiments, controller may include FPGA Mezzanine Card (FMC). In some embodiments, FMC may be used to transfer data in and/or out of embedded processor 520, such as a system on chip. In some embodiments, FMC may connect to an external computing device. In a non-limiting example, computing system 502 may receive instructions and/or other data through FMC. In another non-limiting example, system 500 may output data through FMC. FMC may conform to FMC standards.

With continued reference to FIG. 5, in one or more embodiments, system 500 may include a fixed allocated application program interface (API). "Fixed allocated API" for the purposes of this disclosure is a programming interface that allows a computing system 502 to isolate different computing components. For example, and without limitation, Fixed allocated API may include software configured to dedicate each embedded processor 520 and memory pair to a particular software, virtual environment 544 and/or virtual machine 540. In one or more embodiments, fixed allocated API 532 may act as an intermediary between a software and a hardware. For example, and without limitation, instead of communicating directly with a hardware, a software may first communicate with fixed allocated API 532, wherein fixed allocated API 532 may be allocated resources accordingly. In one or more embodiments, fixed allocated API 532 may generate an abstraction layer between hardware and a software of computing system 502. "Abstraction layer" for the purposes of this disclosure is a software that serves as an intermediary between a higher-level software, such as an operating system and a hardware. In one or more embodiments, fixed allocated API 532 may generate an abstraction layer wherein higher-level software may communicate with fixed allocated API 532 and receive allocated resources. In one or more embodiments, the abstraction layer may provide a set of instructions for how each software component may communicate with a software component. In one or more embodiments, fixed allocated API 532 may allocate hardware resources for particular software through abstraction layer. For example, and without limitation, an embedded processor 520 and dedicated memory pair may be allocated to a particular software, virtual machine 540 and the like wherein other software may not have access to the embedded processor 520 and dedicated memory pair (known henceforth as 'hardware pair'). In one or more embodiments, abstraction layer may allow for allocation of hardware resources wherein each virtual environment 544 and/or software may be allocated an isolated processing component and memory. In one or more embodiments, fixed allocated API 532 may allow for isolation of each embedded processor 520 and dedicated memory on controller card 516. In one or more embodiments, fixed allocated API 532 may isolate an embedded processor 520 and associated dedicate memory from another embedded processor 520 and associated dedicated memory.

With continued reference to FIG. 5, in one or more embodiments, fixed allocated API 532 may further be configured to allocate a particular hardware based on the requirements of the software. For example, and without limitation, a virtual machine 540 requiring larger processing power may be allocated a hardware pair that is configured for larger processing power. In one or more embodiments, fixed allocated API 532 may be accessed directly through the hardware of controller card 516 and/or accessed by host operating system 506. In one or more embodiments, fixed allocated API 532 may contain a machine learning model configured to allocate hardware pairs to various virtual machines 540. For example, and without limitation a plurality of virtual machines 540 may exist wherein fixed allocated API 532 may be configured to allocate a hardware pair to each virtual machine 540. In one or more embodiments, fixed allocated API 532 may utilize a machine learning model to assign each virtual machine 540 to a hardware. In one or more embodiments, each virtual machine 540 may contain resource requirements wherein fixed allocated API 532 may determine the correct hardware pair based on the resource requirements. In one or more embodiments, virtual machines 540 may be allocated to hardware pairs based on projected or anticipated performance metrics, wherein a particular resource requirements and hardware paid may project a particular performance metric. In one or more embodiments, following execution of one or more virtual machines 540 one controller card 516, fixed allocated API 532 and/or host operating system 506 may receive performance metrics for each virtual machine 540 to determine the performance of each virtual machine 540 operating on a particular hardware. In one or more embodiments, fixed allocated API 532 may contain an allocation machine learning model. In one or more embodiments, an allocation machine learning model may be trained with allocated training data. In one or more embodiments, allocated training data may contain a plurality of resource requirements and hardware pairs correlated to a plurality of performance metrics. In an embodiments a particular software having a particular resource requirement may contain a correlated performance metric based on the hardware pair it was assigned to. For example, and without limitation, a virtual machine 540 assigned to a GPU and VRAM may be associated with one set performance metrics whereas a virtual machine 540 assigned to a CPU and RAM may be associated with another set of performance metrics. In one or more embodiments allocated training data may be used to train allocation machine learning model, wherein allocation machine learning model may receive resource requirements and a hardware pair as an input and output performance metrics as an output. In one or more embodiments, fixed allocated API 532 may compare various resource requirement and hardware paid configurations to receive correlated outputs of performance metrics wherein fixed allocated API 532 may select the configuration that allows for increased performance. In one or more embodiments, allocation machine learning model may include and/or be included in any machine learning model as described in this disclosure. In one or more embodiments, allocation machine learning model may operate on host operating system 506 and/or a cloud server to compute outputs wherein the outputs may be transmitted to fixed allocated API 532. In one or more embodiments, outputs may be stored on host memory for future iterations wherein a similar software and hardware pair configuration may be used.

In one or more embodiments, fixed allocated API 532 may create abstraction layer to allow for allocation of a hardware pair to a particular software. In one or more embodiments, allocation may allow for increased isolation between two software wherein a first software may operate on a first hardware pair and a second software may operate on a second separate hardware pair. In one or more embodiments, isolation of software may allow for prevention of direct memory access. In one or more embodiments, isolation of one or more software may allow for increased reliability wherein a failure of a first hardware pair may not affect a second hardware pair.

With continued reference to FIG. 5, in one or more embodiments, fixed allocated API 532 may be contrasted to a flexible API. A "Flexible API" for the purposes of this disclosure is an interface that allows for heterogenous computing. Heterogenous computing may include a system that utilizes multiple differing processors simultaneously by allocating tasks to each processor. For example, and without limitation, a Flexible API may allow for the leveraging of various processes on controller card 516 wherein Flexible API may assign workloads to differing processors based on their availability and capabilities. In one or more embodiments, Flexible API may allow for a software to communicate with an abstraction layer wherein workloads are assigned to differing processors based on their specific purpose. In one or more embodiments, Flexible API may allow for increased performance and efficiency wherein multiple hardware pairs are used to carry out one or more functions. In one or more embodiments, controller card 516 may contain both Flexible API and Fixed allocated API wherein some hardware pairs may be grouped together to create a more efficient system whereas other hardware pairs are isolated to allow for increased security.

With continued reference to FIG. 5, in or more embodiments, system 500 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 500 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 500 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 5, computing system 502 may be configured to create one or more virtual machines 540 by isolating at least one of the plurality of embedded processors 520 and at least one of the plurality of dedicated memory for each virtual machine 540. Virtual machine is described in further detail, such as in reference to FIG. 6. In one or more embodiments, computing system 502 may contain more than one embedded processors 520 and associated dedicated memory wherein each virtual machine 540 may receive an isolated hardware pair. In one or more embodiments, each virtual machine 540 may contain its own isolated hardware pair wherein, for example, a first virtual machine 540 may be allocated a GPU and VRAM and a second virtual machine 540 may be allocated a CPU and RAM. In one or more embodiments, computing system 502 may allocate embedded processor 520 and dedicated memory to virtual machine 540 using Fixed allocated API as described above. In one or more embodiments, computing system 502 may allocate embedded processor 520 and dedicated memory to virtual machine 540 using a bare-metal and/or type-1 hypervisor 536. Hypervisor is described in further detail below such as in reference to FIG. 6. In one or more embodiments, hypervisor 536 may allow for allocation and/or isolation of embedded processor 520 and dedicated memory. In one or more embodiments, hypervisor 536 may allow for device passthrough. "Device passthrough" for the purposes of this disclosure is a system in which a hypervisor 536 may allow for direct and exclusive access of one or more hardware components to a virtual machine 540. For example, and without limitation, hypervisor 536 may allow for a virtual machine 540 to have direct access to embedded processor 520 and dedicated memory. In one or more embodiments, each virtual machine 540 may have direct access to a separate embedded processor 520 and a separate dedicated memory. In one or more embodiments, device passthrough may allow for a pass through of the host operating system 506 wherein virtual machine 540 may directly access the hardware pair. In one or more embodiments, device pass through may include GPU passthrough wherein a GPU may pass through and be directly connected to virtual machine 540. In one or more embodiments, device passthrough may include FPGA pass through wherein a virtual machine 540 may have direct access to FPGA chip. In one or more embodiments, Hypervisor may create one or more machines as described in further detail below. In one or more embodiments, hypervisor 536 may isolate each embedded processor 520 and dedicated memory and allocate embedded processor 520 and dedicated memory to virtual machine 540. In one or more embodiments, virtual machines 540 may be created in any way as described in this disclosure.

With continued reference to FIG. 5, computing system 502 is configured to generate a virtual environment 544. Virtual environment may include any virtual environment 544 as described in this disclosure such as in reference to FIG. 6. In one or more embodiments, computing system 502 may be configured to generate a virtual environment 544 for each virtual machine 540 of one or more virtual machines 540. In one or more embodiments, each virtual environment 544 may include a differing operating system wherein a first virtual environment 544 may contain a differing operating system as a second virtual environments 544. In one or more embodiments, computing system 502 may be configured to generate a separate virtual environment 544 within each virtual machine 540. In one or more embodiments, computing system 502 may be configured to deploy software container 548 (as described in further detail below). In one or more embodiments, software container 548 may be transferred to virtual environment 544 using host operating system 506. In one or more embodiments, host operating system 506 may contain virtual remote, an SSH shell and the like wherein software container 548 may be transmitted to virtual environment 544. In one or more embodiments, host operating system 506 may be configured to create virtual environments 544, virtual machine 540, virtual script and/or virtual package wherein host operating system 506 may transfer virtual environments 544, virtual machine 540, virtual script and/or virtual package to one or more partitions. In one or more embodiments, computing system 502 may contain one or more storage devices wherein each storage device may contain virtual machine 540, virtual environment 544 and the like. In one or more embodiments, computing system 502 may be configured to allocate storage space and/or memory through the creation of partitions as described in further detail below.

Figure 6:
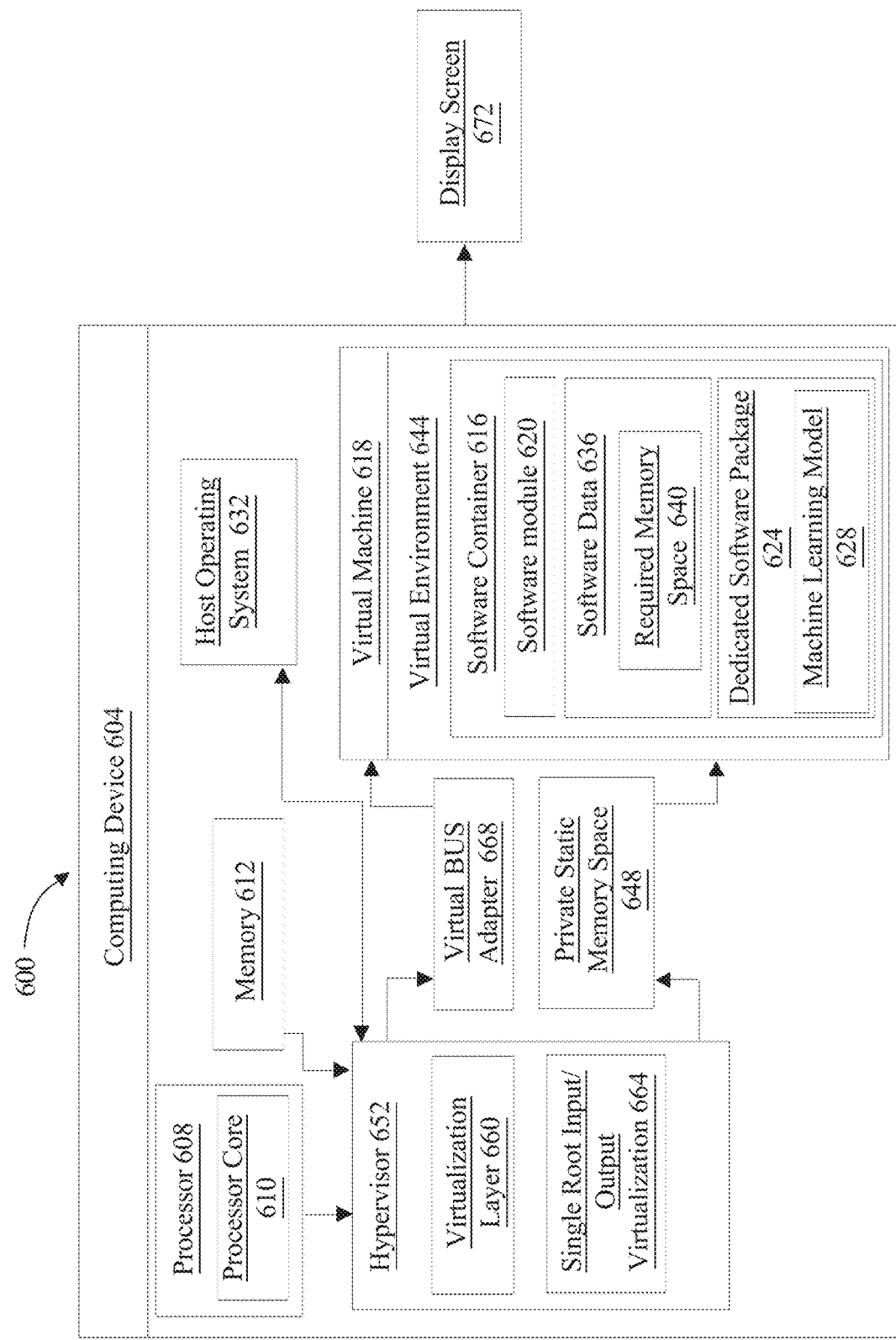
FIG. 6 is a diagram depicting an exemplary system for providing a safety critical operating environment container architecture system.

With continued reference to FIG. 5, computing system 502 may include computing device and/or system as described in reference to FIG. 6. In one or more embodiments, computing system 502 may perform one or more functions of computing device as described in FIG. 6. In one or more embodiments, computing system 502 may be configured to perform any step and/or processes as described in this disclosure, such as, but not limited to, in reference to FIG. 6. In one or more embodiments, computing system 502 may be configured to isolate virtual environments 544, virtual machines 540, software containers 548 and the like as described in FIG. 6. In one or more embodiments, each virtual machine 540 as described in reference to FIG. 6 may operate on a separate embedded processor 520 and dedicated memory. In one or more embodiments, hypervisor 536 such as a type 1 hypervisor 536 may facilitate the creation of one or more virtual machines 540, one or more virtual environments 544 and the like. In one or more embodiments, host operating system 506 may be operated on computing device, wherein one or more functions, scripts, packages and the like may be deployed from host operating system 506 and onto controller card 516. In one or more embodiments, computing device may contain host operating system 506 such as host operating system 506 as described in reference to FIG. 6. In one or more embodiments, hypervisor 536 may be instantiated and managed on host operating system 506. In one or more embodiments, a virtual remote may be used to access controller card 516 and/or one or more operating systems operating on controller card 516 through host operating system 506. In one or more embodiments, host operating system 506 may be stored on a storage device separate from a storage used for controller card 516.

Referring now to FIG. 6, a system 600 for providing a safety critical operating environment container architecture system is described. System 600 may include a computing device 604, a processor 608, and memory 612.

With continued reference to FIG. 6, processor 608 is configured to receive one or more software containers 616. A software container may run software in an isolated virtual space. For example, and without limitation, software container 616 may include a document drafting software wherein the software container 616 may contain any information necessary to execute the document drafting software on more than one operating systems. In one or more embodiments, software container 616 may allow for an application to be executed and/or deployed on multiple operating systems. In one or more embodiments, software container 616 may contain libraries, configuration files, binary code and/or any other information that is necessary to execute the application and/or software. In one or more embodiments, a software container 616 may contain some degree of independence from the operating system and/or host system 600 wherein the software container 616 does not rely on the operating system for any information needed to properly deploy an application within software container 616. In one or more embodiments, operating systems may lack the proper functionalities to execute an application, wherein software container 616 may be used to ensure that any necessary functionalities, information, and the like are self-contained. In one or more embodiments, software container 616 may contain a container image, wherein the container image is a portable executable image combined with a manifest that is used by a container manager to deploy the container image on an operating environment with appropriate data services and restrictions. In one or more embodiments, software container 616 may contain restrictions and/or instructions on how a software may communicate with the operating system in which it is deployed on. In one or more embodiments, software container 616 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system 600 management tools.

With continued reference to FIG. 6, software container 616 may contain a software module 620. A "software module," for the purposes of this disclosure, is an application or software that is sought to be executed. For example, and without limitation, software module 620 may include a web browser, word processing software, a media player, a digital calculator, flight systems software, military software and the like. In one or more embodiments, software module 620 may include an application that is sought to be executed within software container 616. In one or more embodiments, any data and/or information within software container 616 may be used to ensure proper execution of software module 620. In one or more embodiments, software container 616 may contain libraries, dependencies, and the like to ensure proper execution of software module 620. In one or more embodiments, software module 620 may include an executable file.

With continued reference to FIG. 6, software container 616 may contain one or more dedicated software packages 624. In one or more embodiments, software container 616 may contain a plurality of dedicated software packages 624. "Dedicated software package" for the purposes of this disclosure are components that are necessary to execute software module 620. For example, and without limitation, dedicated software package 624 may include a library or a plurality of libraries wherein the libraries contain pre-written code that be called by various software and/or applications such as software module 620. In one or more embodiments, software module 620 may utilize code that has already been written wherein software module 620 may execute prewritten code. In one or more embodiments, dedicated software package 624 may include libraries, dependencies in which the software module 620 relies on to operate and the like. In one or more embodiments, dedicated software packages 624 may be configured to facilitate execution of software module 620. In one or more embodiments, dedicated software package 624 may include various software configurations for software module 620. "Software configuration" for the purposes of this disclosure refer to instructions and parameters that define how the software module 620 should operate. For example, and without limitation, a software configuration may include instructions on how software module 620 may startup, how software module 620 may interact with a network, where data should be stored if any, authorized users. Maximum or minimum CPU requirements, security policies and the like. In one or more embodiments, dedicated software package 624 may further include a runtime environment in which software module 620 is executed within. "Runtime environment" or a "container runtime" for the purposes of this disclosure is a platform that allows software container 616 to be executed on a host operating system 632. For example, and without limitation, A container runtime may be used to execute software module 620 within software container 616 and configured to provide isolation between software container 616 and the host operating system 632. In one or more embodiments, a container runtime may be responsible for executing software container 616 and all of its necessary dedicated software packages 624. In one or more embodiments, container runtime may be situated on a host operating system 632 and configured to execute software container 616. In one or more embodiments, container runtime may provide a platform in which software module 620 may be executed. In one or more embodiments, container runtime may be configured to isolate software module 620 from a host operating system 632.

With continued reference to FIG. 6, dedicated software package 624 may further include one or more software defined intelligent networking (SDIN) systems. "Software defined network" (SDN) for the purposes of this disclosure is a system 600 in which virtual networks can be created to direct traffic on a network. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers 616. Software containers may be limited in network resources due to their level of importance; such that less important software containers 616 do not crowd a network for less important matters. "Software defined intelligent network" (SDIN) for the purposes of this disclosure. is an SDN which utilizes artificial intelligence and machine learning to optimize the performance of a network. In SDIN, machine learning may be used to predict issues, predict network demands and adjust the network accordingly. In some cases, SDIN may be used to ensure that software containers 616 do not interact with one another. An SDIN controller may be used to interact with a network. The SDIN controller may monitor network traffic and make decision to optimize traffic for software container 616. In one or more embodiments, SDIN may ensure enable dynamic mesh networks, and facilitate assured, secure data sharing across Link-16, BFT, 4586, and RAC2.

With continued reference to FIG. 6, dedicated software package 624 may include one or more machine learning models 628, wherein the machine learning models 628 may be configured to operate independent of a data source connection. In one or more embodiments, software container 616 and/or dedicated software package 624 may include a machine learning module to implement one or more algorithms or generate one or more machine-learning models 628 to generate outputs. However, the machine learning module is exemplary and may not be necessary to generate one or more machine learning models 628 and perform any machine learning described herein. In one or more embodiments, one or more machine-learning models 628 may be generated using training data. Training data may include inputs and corresponding predetermined outputs so that a machine-learning model 628 may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from libraries, dependencies and the like contained within software container 616 or be provided by a user. In other embodiments, a machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model 628 and/or any other machine learning model 628 using training data. Training data may be data sets that have already been converted from raw data whether manually, by machine, or any other method. In some cases, the machine learning model 628 may be trained based on user input. For example, a user may indicate that information that has been output is inaccurate wherein the machine learning model 628 may be trained as a function of the user input. In some cases, the machine learning model 628 may allow for improvements to computing device 604 such as but not limited to improvements relating to comparing data items, the ability to sort efficiently, an increase in accuracy of analytical methods and the like. In one or more embodiments, the machine learning models 628 may operate independent of a data source connection wherein dependencies, training data, libraries and the like may be contained within software container 616.

With continued reference to FIG. 6, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, dependencies within software container 616 and/or be provided by a user. In other embodiments, machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 6, each software container 616 may contain a self-contained machine learning model 628 wherein training data may be contained within the software container 616 as well. In one or more embodiments, software container 616 may be connected to a database upon execution of software module 620 wherein training data may be retrieved from the database. In one or more embodiments, each software container 616 may contain training data specific to each software module 620. For example, and without limitation, a first software container 616 may contain a first machine learning model 628 and a first training data set, and a second software container 616 may contain a second machine learning model 628 and a second training data set. In one or more embodiments, containerization of a machine learning model 628 as well as training data may allow for portability of software module 620. In one or more embodiments, software container 616 may contain an application program interface (API) that is configured to allow software module 620 and the machine learning model 628 to interact with one another. In one or more embodiments, the machine learning model 628 may contain its own libraries, dependencies and the like. in one or more embodiments, software container 616 may contain the requisite code to call and implemented the machine learning model 628 into software module 620.

With continued reference to FIG. 6, software container 616 may contain a container image wherein the container image is an executable image combined with a manifest that is used by the container manager to deploy the executable image on an operating with appropriate data services and restrictions. In one or more embodiments, container image may include software module 620 and any dedicated software packages 624 needed to execute software module 620. In one or more embodiments, the container runtime has the ability to deploy container images on the operating system. The container runtime may interface with container image repositories, validate the authenticity of container images, loads container executables into container environments, connect container environments to operating service, and exports management APIs to system 600 management tools. In one or more embodiments, the container run time may create a container environment, which is an isolated space having allocated data services requested by the container runtime and created by the operating system contents contained within container images and deployed by the container runtime. The Namespace controls are the operating systems soft partitioning feature set. The operating system provides the ability to restrict the visibility of operating system features and resources and limit the capacity of resources allocated to processes.

With continued reference to FIG. 6, software container 616 may contain any necessary information for execution of software module 620 on one or more differing computing systems and/or operating systems. In one or more embodiments, a containerization tool may be used to generate software container 616. In one or more embodiments, the containerization tool may receive dedicated software packages 624, software module 620, software data 636 and/or any other information necessary to execute software module 620 and generate a container image. In one or more embodiments, the generation of software container 616 and/or container image may be referred to as a containerization process. In one or more embodiments, software container 616 and/or container image may be executed using container runtime. Container runtime may be situated on host system 600 in which software container 616 is seeking to be deployed. In one or more embodiments, container runtime may be referred to as a "container manager." In one of or more embodiments, container runtime may be configured with managing execution of software container 616. In one or more embodiments, container runtime may provide an interface for executing software container 616 and stopping software container 616. In one or more embodiments, container runtime may be configured to isolate software container 616 from other containers on a host operating system 632. In one or more embodiments, an isolation of software container 616 from a host operating system 632 may be achieved by providing dedicated namespaces for each software container 616. In one or more embodiments, dedicated namespaces may allow for isolation of software module 620 from a host operating system 632. In one or more embodiments, a dedicated namespace may ensure that retrieved functions, codes, instructions, and the like are limited to information within contained software container 616 and not the host operating system 632. In one or more embodiments, container runtime may further isolate software container 616 by managing and limiting resources to software container 616, such as but not limited to, processing resources, memory resource and the like. In one or more embodiments, container runtime may be configured to limit resources to each software container 616 on a host operating system 632 in order to ensure that resources are not entirely consumed by a single software container 616. In one or more embodiments, software container 616 may contain various runtime configurations which may limit resources, contain information about networks and/or any other information related to the behavior of software module 620 within software container 616.

With continued reference to FIG. 6, software container 616 and/or container image may include a pre-defined operational rule. As used in this disclosure, a "pre-defined operational rule" is a set of instructions or conditions that dictate how the software, when executed, should behave, respond, or operate under specific scenarios or environment. In a non-limiting example, pre-defined operational rule may encapsulate business logic or functional requirements of the software. In some cases, pre-defined operation rule may specify a plurality of core functionalities and processes the software is intended to perform. In some cases, pre-defined operational rule may include one or more error handling procedures i.e., how software should respond to unexpected inputs or errors. In some cases, pre-defined operational rule may include one or more security protocols such as, without limitation, instructions related to authentication, authorization, data protection, and/or the like. In some cases, pre-defined operational rule may, additionally, or alternatively, include one or more conditions and/or thresholds for software performance e.g., response times, execution times, and/or the like. In an embodiments, pre-defined operation rule may be configured as a metric to ensure that the software application behaves in a pre-defined way. In another embodiment, pre-defined operation rule may dictate fail-safe behaviors or fallback procedures. In a non-limiting example, a pre-defined operation rule may dictate how a software application should respond if one or more sensors communicatively connected to computing device 604 detects a certain anomaly in flight data during cruising e.g., automatically engaging an emergency procedure. In another non-limiting example, a pre-defined operational rule may specify the process and validations for pilot inputs. In some cases, missing pre-defined operation rule may result in a failure of executing at least a part of the software application. In some cases, pre-defined operational rule may entirely depend on system 600 health and safety; for example, and without limitation, pre-defined operational rule may be qualified under DO-178C or to ensure the availability, robustness, and integrity of the SOE.

With continued reference to FIG. 6, software container 616 may be configured to be executed on a host operating system 632. "Host operating system" for the purposes of this disclosure is the operating system of the computing device 604 in which software container 616 will be executed on. For example, and without limitation, in instances where software container 616 is executed on a Linux operating system, Linux may be referred to as the host operating system 632. In one or more embodiments, software container 616 may be executed on a plurality of host operating systems. In one or more embodiments, software container 616 may be executed on host operating system 632 using container runtime. In one or more embodiments, container runtime may virtualize software module 620 within software container 616 by ensuring that a software within software container 616 is independent of the host operating system 632.

With continued reference to FIG. 6, in or more embodiments, software container 616 may contain software data 636. Software data may include information indicating the computing requirements necessary to properly execute container. For example, and without limitation, software data 636 may contain information indicating the file size of software container 616 wherein a host operating system 632 must contain a storage space larger than the file size of software container 616 for software container 616 to be properly executed. In one or more embodiments, software data 636 may contain information indicating various operating systems in which software container 616 is compatible with. In one or more embodiments, software data 636 may contain the minimum processing power that may be needed for proper execution of software container 616. In one or more embodiments, software data 636 may be used to properly allocated resources for software container 616. In one or more embodiments, computing device 604 and/or container runtime may receive software data 636 and allocate a particular amount of memory, processing power and the like for software container 616. In one or more embodiments, software data 636 may be received by an aggregate of metadata contained within software container 616. For example, and without limitation, software data 636 may include an aggregate file size of all information within software container 616. In one or more embodiments, software module 620 may contain various resource requirements wherein the resource requirements may be received as software data 636. In one or more embodiments, software data 636 may contain a required memory space 640. "Required memory space" for the purposes of this disclosure is a particular amount of memory that is needed to properly instantiate software container 616. For example, and without limitation, required memory space 640 may include two gigabytes, wherein a computing system 600 must contain at least two gigabytes for software container 616 to properly execute. In one or more embodiments, required memory space 640 may include an indication of the amount of private memory and/or secondary memory needed for proper functioning of software module 620 within software container 616. In one or more embodiments, required memory space 640 may contain a required amount of storage space for a virtual machine 618 prior to installation of an operating system in the virtual machine 618. In one or more embodiments, required memory space 640 may contain a required amount of storage space for a virtual environment 644 after an operating system has already been installed.

With continued reference to FIG. 6, software data 636 may include a partition policy. A "partition policy," for the purpose of this disclosure, is rules, constraints, and configurations for how a partition (or a virtual machine 618/container) within virtual environment 644 accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it's preemptable. In an embodiment, at least a partition policy may define a level of separation between plurality of partitions to ensure that one partition's operation doesn't adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system 600, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system 600 performance e.g., desired energy efficiency, ensuring that each virtual machine 618 only the resources it needs.

With continued reference to FIG. 6, software container 616 may be periodically modified and/or updated. In one or more embodiments, a modification and/or update of a software may be limited to the operating system in which the software is running. In one or more embodiments, modifications and/or updates of a software may be specific to each operating system in which the software is located. In one or more embodiments, modification and/or update of software container 616 may allow for application of updated software container 616 on one or more operating system platforms. In one or more embodiments, additional software may be added to software container 616 wherein execution of software container 616 in a future instances may include added software. In one or more embodiments, data volumes may be added to software container 616 wherein software module 620 may access data volumes. "Data volume" for the purposes of this disclosure is data that can be accessed by a software container 616. In one or more embodiments, data volume may be stored on a host operating system 632 wherein software container 616 may access data volume and transmit and/or receive information. In one or more embodiments, data volume may include information such as but not limited to log files, additional libraries, various information and the like. In one or more embodiments, data volume may include databases which can be accessed by storage container. In one or more embodiments, data volume may allow for the storage of data generated by software container 616.

With continued reference to FIG. 6, in one or more embodiments, software container 616 may be associated with a design assurance level classification (DAL). "Design assurance level classification" for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, software data 636 may contain DAL certification of software container 616. In one or more embodiments, software container 616 may contain software modules 620 associated with aviation and/or military technology, wherein each software container 616 may contain DAL classification. For example, and without limitation, software container 616 may include software such as engine control systems, inflight entertainment, missile guidance systems, fuel monitoring systems and the like.

With continued reference to FIG. 6, computing device 604 may receive software container 616 from a user. A user may include an individual interacting with computing device 604 and seeking execution of software container 616. In one or more embodiments, computing device 604 may receive software container 616 from a secondary memory communicatively connected to computing device 604, from a database communicatively connected to computing device 604, from a portable memory drive such as a USB memory stick and the like. In one or more embodiments, computing device 604 may receive one or more software containers 616 wherein each software container 616 may be associated with a separate and distinct software module 620. In one or more embodiments, one or more software containers 616 may be located on computing device 604 wherein selection of a software container 616 may indicate receipt of a software container 616. In one or more embodiments, more than one selection may be made simultaneously wherein computing device 604 perform one or more actions simultaneously. In one or more embodiments, receipt of software container 616 may indicate a placement of one or more software containers 616 on a host operating system 632.

With continued reference to FIG. 6, in one or more embodiments, computing device 604 is configured to generate and/or create a separate virtual environment 644 for each software container 616. "Virtual environment" for the purposes of this disclosure is a self-contained environment within a computing device 604 that allows for the isolation of one or more software from the host operating system 632. For example, and without limitation, a virtual environment 644 may include a separate and isolated operating system on computing device 604 that does not interact with the host operating system 632. In one or more embodiments, virtual environment 644 may include an environment located on a virtual machine 618. Host operating system includes a primary operating system installed on a computing device 604 hardware. In some cases, host operating system 632 may manage underlaying physical resources and facilitate the running of one or more guest operating systems (guest OS). In a non-limiting example, Linux operating system running on computing device 604 as the primary operating system may be the host operating system 632. Software applications integrated to computing device 604 as described herein may be run atop Linux operating system. In some cases, virtual environment 644 may be software-defined, for example, and without limitation, virtual environment 644 may include a simulated operating system that operates independently of the underlaying physical hardware of computing device 604. In some cases, virtual environment 644 may emulate one or more hardware, software, networks, or a combination thereof. In a non-limiting example, a plurality of partitions may be allocated inside of virtual environment 644, wherein each partition may include a virtual machine 618 (VM). "Virtual machine," for the purpose of this disclosure, is a software-based emulation of a computer system 600 that is capable of running one or more software applications as if they were running on physical hardware. For instance, and without limitation, virtual environment 644 may include a separate and isolated operating system on computing device 604 that does not interact with host operating system 632.

In one or more embodiments, a virtual machine 618 may be used to create and execute an operating system that is separate and isolated from the host operating system 632. In one or more embodiments, virtual machine 618 may allow for the creation of virtual environments 644. In one or more embodiments, generation of a virtual environment 644 may include allocation of memory space on memory on computing device 604. "Memory allocation" for the purposes of this disclosure is the process of reserving computer space for a particular purpose. In one or more embodiments, memory may be allocated for generation of a virtual environment 644. In one or more embodiments, memory allocation may be static wherein a predefined amount of space if reserved and cannot be modified. For example, and without limitation, in a static memory allocation, if a virtual environment 644 is given 2 gigabytes of memory, the memory cannot be increased or decreased. In one or more embodiments, memory allocation may be dynamic wherein memory may be continuously increased based on the demands of the virtual environment 644. In one or more embodiments, memory may be allocated in order to ensure that a virtual environment 644 contains the proper amount of space in order to perform its intended functions. In one or more embodiments, creation of a virtual environment 644 may include creation of a guest operating system using virtual machine 618.

In one or more embodiments, memory allocation may include a process of reserving memory space on the host operating system 632 for use within the virtual environment 644. In one or more embodiments, memory allocation may further include partitioning of memory wherein the memory may be portioned into more than one parts. In one or more embodiments, memory may be partitioned into a root partition (also known as a parent partition) and one or more child partitions. The root partition may contain the operating system while the child partitioning contain the virtual environments 644. In one or more embodiments, management of the child partitions may be done through the root partition. In one or more embodiments, computing device 604 may be configured to partition memory into more than one or child partitions wherein each child partition may be associated with a separate software container 616. "Partition" for the purposes of this disclosure refers to a separated section of physical hardware on computing device 604. For example, and without limitation, a memory may be split into several partitions wherein each partition may be used for separate and distinct storage tasks. In one or more embodiments, one or more various physical hardware components may be partitioned such as but not limited to a processor 608, a primary memory, a secondary memory, a network device and the like. In one or more embodiments, partitioning may include the use of disk management software and/or other partitioning software that may allow for the splitting of a physical hardware component into one or more separate partitions.

With continued reference to FIG. 6, virtual environment 644 may be created on host operating system 632. In one or more embodiments, in instances where virtual environment 644 is generated on a host operating system 632, the virtual environment 644 must communicate with the host operating system 632 to receive resources such as computing power, memory space and the like. In one or more embodiments, one or more virtual environments 644 may be generated using a hypervisor 652. A hypervisor may include a software module which is configured to create and manage virtual machines. In one or more embodiments, hypervisor 652 may create one or more virtual machines 618 wherein each virtual machine 618 may host a separate and isolated virtual environment 644. In one or more embodiments, each virtual environment 644 may contain a separate and isolated operating system. In one or more embodiments, a hypervisor 652 may run on the host operating system 632 wherein the hypervisor 652 may generate virtual machines 618 on the host operating system 632. In one or more embodiments, a hypervisor 652 may run directly on the hardware of a computing device 604 without reliance of an operating system. In one or more embodiments, a hypervisor 652 that runs independent of a host operating system 632 may be referred to as a "Type 1" and/or "bare metal" Hypervisor. In one or more embodiments, in a bare metal hypervisor 652, the hypervisor 652 is directly installed on the hardware of computing device 604 rather than through the operating system. In one or more embodiments, a type 1 hypervisor 652 may partition resources, such as memory processing power and the like for each virtual machine 618. In one or more embodiments, virtual machines 618 may communicate directly with the hardware of computing device 604 rather than the host operating system 632. In one or more embodiments, in a bare metal hypervisor 652 virtual machines 618 are not susceptible to issues caused by the host operating system 632 and/or other virtual machines 618. In one or more embodiments, virtual machines 618 may be isolated and unaware that other virtual machines 618 exist. In one or more embodiments, a bare metal hypervisor 652 may allow for increased performance wherein virtual machines 618 may communicate directly with hardware rather than through the intermediate host operating system 632. In one or more embodiments, a bare metal hypervisor 652 may allow multiple virtual machines 618 to run simulates wherein failure of one virtual machine 618 may not result in a failure of a second virtual machine 618. In one or more embodiments, in a type 2 hypervisor 652, partitioning and resource allocation may occur above the host operating system 632 layer, whereas in a type 1 hypervisor 652 partitioning may occur below the host operating system 632 and directly with the hardware of computing device 604. In one or more embodiments, in a type 2 hypervisor 652, virtual environments 644 may rely on the host operating system 632 for proper resource allocation and memory allocation whereas in a type 1 hypervisor 652, virtual environments 644 may only rely on the hardware.

In one or more embodiments, hypervisor 652 may include a software configured as a virtual machine monitor (virtual machines 618). In some cases, hypervisor 652 may be configured to allow a physical machine (host) such as computing device 604 to run a plurality of operating systems simultaneously by virtualizing system 600 hardware e.g., processors 608, memory, I/O devices, and/or the like. In a non-limiting example, hypervisor 652 may create one or more virtual machines 618 wherein each virtual machine 618 may host a separate and isolated software operating environment (SOE). In some cases, hypervisor 652 may run directly on the hardware of computing device 604 without reliance of an operating system. Instantiating hypervisor 652 may include launching or initializing hypervisor 652 in host operating system 632. In some cases, instantiation of hypervisor 652 may create virtual environment 644 wherein a plurality of partitions (i.e., virtual machines 618) can be run and managed. In an embodiment, hypervisor 652 may include a "type 1 hypervisor" that may run independently of host operating environment. In a non-limiting example, hypervisor 652 may include a bare metal hypervisor 652 that runs directly on the computing device 604 hardware and manages one or more quest operating systems. Exemplary type 1 hypervisor 652 may include, without limitation, MICROSOFT HYPER-V, VMWARE ESXI, XEN, and/or the like. In some cases, virtual machines 618 created by type 1 hypervisor 652 may communicate directly with the hardware of computing device 604 rather than host operating system 632. In some cases, virtual machines 618 created by type 1 hypervisor 652 may not be susceptible to issues caused by the host operating system 632 and/or other virtual machines 618 in virtual environment 644. In a non-limiting example, one or more virtual machines 618 may be isolated and unaware of existence of other virtual machines 618. In an embodiment, type 1 hypervisor 652 may allow for an increased performance wherein virtual machines 668 within virtual environment 644 may communicate directly with hardware rather than through the intermediate host operating system 632. In a non-limiting example, type 1 hypervisor 652 may allow one or more virtual machines 618 to run simultaneously, wherein the failure of a first virtual machines 618 may not result in a failure of a second virtual machines 618.

With continued reference to FIG. 6, in another embodiment, hypervisor 652 may include a "type 2 hypervisor" that runs atop host operating system 632 similar to any other software applications. In one or more embodiments, hypervisor 652 may include a hosted hypervisor 652 having resource allocation occurred right above host operating system 632. In some cases, type 2 hypervisor 652 may rely on host operating system 632 of computing device 604, whereas in type 1 hypervisor 652 as described above, may only rely on the hardware of computing device 604. Exemplary type 2 hypervisor 652 may include, without limitation, VMWARE WORKSTATION, ORACLE VIRTUAL BOX, and/or the like. In some cases, when instantiating type 2 hypervisor 652, processor 608 may launch type 2 hypervisor 652 that has been pre-installed similar to launching any software application. Once host OS is up and running, processor 608 may then start type 2 hypervisor 652 to create, manage and run virtual machines 618 atop the host OS; however, for type 1 hypervisor 652, since it runs directly on "bare metal" (i.e., hardware without requiring an underlying operating system), instantiating type 1 hypervisor 652 may involve booting the system 600 from a medium such as, without limitation, a USB drive, CD, or a network source containing hypervisor 652. Once booted, hypervisor 652 may take control of at least a portion of hardware resources and manage and/or launch one or more virtual machines 618.

With continued reference to FIG. 6, processor 608 may then generate a virtualization layer 660 supervised by hypervisor 652, wherein a host operating system 632 within virtual environment 644 is operated by the virtualization layer 660. As used in this disclosure, a "virtualization layer" is a software layer (or interface) that sits between hardware layer (e.g., physical CPU, memory, I/O devices, and/or the like) and virtual environment 644 having one or more virtual machines 618. In some cases, virtualization layer 660 may be configured to virtualize the underlaying hardware resources and present the virtualized hardware resources to plurality of virtual machines 618 as though they are dedicated to each virtual machine 618. In a non-limiting example, a plurality of partitions of a single physical hardware component as described herein may share the same physical hardware resources through virtualization layer 660, without being aware of each other. In some cases, virtualization layer 660 may be instantiated when hypervisor 652 is booted or launched. In a non-limiting example, in case of a type 1 hypervisor 652, virtualization layer 660 may be generated when machine starts up since hypervisor 652 directly interface with hardware. In another non-limiting example, in case of a type 2 hypervisor 652, virtualization layer 660 may be established once hypervisor 652 software is initiated on top of host OS. In some cases, hypervisor 652 may be configured to monitor and manage one or more hardware abstraction and allocate these virtualized resources to designated virtual machines 618. In a non-limiting example, virtualized resources may include CPU time, memory space, I/O operations and/or the like. In some cases, virtualized resources may be allocated based on partition policy as described in detail below. In some cases, hypervisor 652 may manage the scheduling of virtual machines 618 tasks on actual cores. In some cases, hypervisor 652 may handle interruptions, exceptions, and any events that occur, deciding which virtual machines 618 or service needs attention. In some cases, hypervisor 652 may be configured to isolate one or more virtual machines 618 from rest of virtual machines 618 to maintain system 600 security and stability. In other cases, hypervisor 652 may be configured to manage lifecycle operations of one or more virtual machines 618 such as, without limitation, creation, modification, deletion, migration, and/or the like.

With continued reference to FIG. 6, in one or more embodiments, one or more physical hardware components of computing device 604 may be partitioned. In one or more embodiments, one partition of the plurality of partition may contain host operating system 632. In one or more embodiments, host operating system 632 may be used to manage hypervisor 652, instantiate virtual machines 618 and the like. In one or more embodiments, host operating system 632 may operate on primary partition and/or a parent partition wherein virtual machines 618 may operate on child partitions. In one or more embodiments, management of hypervisor 652 may occur on host operating system 632. In one or more embodiments, one or more processes as described herein may occur on host operating system 632 prior to being implemented within child partitions.

With continued reference to FIG. 6, in a non-limiting example, when host operating system 632 is created, a pre-defined set of virtual hardware resources may be provided by virtualization layer 660, wherein the pre-defined set of virtual hardware resources may include, but is not limited to processor cores 610, portion of virtualized memory, virtual disks, virtual network interfaces, among others. As host operating system 632 attempts to execute one or more operations or access its hardware, host operating system 632 may interface with virtualization layer 660, for instance, and without limitation, when virtual machine 618 tries to use processor 608, it may be scheduled by hypervisor 652 onto physical processor 608 on computing device 604 through virtualization layer 660. In some cases, host operating system 632 may receive these resources as if they are dedicated hardware components, oblivious to the abstraction layer beneath. In some cases, virtualization layer 660 may handle I/O operations, translating virtual disk or network accesses to actual operations on the physical hardware. Any interruption, exception, or system 600 call made by host operating system 632 may be intercepted by virtualization layer 660 which then communicates with hypervisor 652 to handle or service that request.

With continued reference to FIG. 6, in some cases, a plurality of partitions may include at least a dedicated partition, wherein one or more I/O operations may be consolidated into the at least a dedicated partition. In some cases, such partition may include a specialized virtual machine 618 that is configured to manage and handle I/O operations for other virtual machines 618, acting as an intermediary between plurality of partitions and/or quest virtual machines 618 and physical hardware resources through an I/O physical bus e.g., a virtualized PCI bus that connects devices to main system 600. In a non-limiting example, at least a dedicated partition may include a I/O virtual machine 618 containing a plurality of FACE I/O service segments (IOSS), wherein each IOSS may provide a standardized interface between OSS and platform-specific hardware. I/O virtual machine 618 may be configured to manage all I/O operations in adherence to FACE technical standards as described above. In a non-limiting example, through plurality of IOSS, I/O virtual machine 618 may include a virtual machine 618 that interface directly with platform's avionic hardware connected to computing device 604 in a way that is standardized across different air vehicles and systems. In some cases, standardized device drives and/or adapters may be provided by IOSS for various avionic devices. For example, when a quest virtual machine 618 or a software application integrated into the system 600 as described below wants to access a hardware resources, it may be configured to indirectly communicate with the I/O virtual machine 618, plurality of IOSS having standardized drivers for the hardware may process the request as per pre-defined system 600 specification (e.g., FACE specification). In these cases, other partitions or virtual machines 618 may be less susceptible to I/O-related faults or security breaches. Security protocols may be standardized and attach surface may be reduced by centralizing drivers and I/O operations since other virtual machines 618 do not directly access I/O hardware, reducing potential vulnerabilities. In other cases, updates, or changes to one or more I/O device drivers or I/O related services may be done in I/O virtual machine 618 without affecting or rebooting the rest of virtual machines 618.

With continued reference to FIG. 6, hypervisor 652 may include single root input output virtualization (SR-IOV) 664. "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV 664 may include the virtualization of physical components such as but not limited to, a GPU, network adapter, storage controllers, FPGA devices, audio processing cards, solid state drives and the like. In one or more embodiments, SR-IOV 664 may allow for virtual machines 618 to access a single physical device. In one or more embodiments, multiple virtual machines 618 may have direct access to a physical device without an operating system allocating resources. In one or more embodiments, SR-IOV 664 may allow for the sharing of resources, such as for example network adapters, while still maintaining independence. In one or more embodiments, SR-IOV 664 may allow for multiple virtual machines 618 operating on a type 1 hypervisor 652 to have access to physical devices without an intermediary such as a shot operating system. In one or more embodiments, computing devices may contain physical hardware that is capable of virtualization. In one or more embodiments, hypervisor 652 may contain the proper systems and/or software to enable SR-IOV 664 wherein each virtual machine 618 may receive a virtual component. In one or more embodiments, SR-IOV 664 may allow for one or more separate virtual environments 644 with direct access to one or more physical hardware components of computing device 604. In one or more embodiments, hypervisor 652 may include one or more virtual binary unit system (BUS) adapters 668. A binary unit system adapter (BUS) for the purposes of this disclosure is a hardware component, such as a cable, that allow communication between one or more physical devices on computing device 604. In one or more embodiments, BUS adapters may include various physical hardware such as but not limited to, USB adapters, graphics card adapters, sound card adapter, network adapter and the like. "Virtual Bus adapter" for the purposes of this disclosure is a software that is configured to mimic a physical BUS adapter and provide a connection between one or more virtual machines 618 and/or containers. For example, and without limitation, Virtual BUS 668 may allow for communication between one or more virtual machines 618 and a network card. In one or more embodiments, BUS adapters may be virtualized to allow for connection of one or more virtual machines 618 to one or more physical devices. In one or more embodiments, virtual BUS 668 may emulate various physical devices wherein one or more virtual machines 618 may connect to the virtual BUS 668. In one or more embodiments, Virtual BUS 668 may include virtualized versions of physical hardware wherein one or more virtual machines 618 may communicate with the one or more virtualized versions and wherein the virtualized versions may then communicate with the physical hardware. In one or more embodiments virtual BUS adapters may allow for increased isolation between one or more virtual environments 644, wherein each virtual environment 644 is connected to a separate virtual BUS adapter.

With continued reference to FIG. 6, computing device 604 is configured to create a separate virtual environment 644 for each of the one or more software containers 616 by allocating a dedicated private static memory space 648. "Dedicated private memory space" for the purposes of this disclosure refers to a partition of a storage device that is reserved exclusively for software container 616. For example, and without limitation, a storage device may include several partitions wherein at least partition may be reserved exclusively for the use of software container 616. "Dedicated private static memory space" for the purposes of this disclosure refers to a partition having a fixed size value. In a static memory allocation, memory and/or storage is allocated prior to partitioning and cannot be changed. In contrast to static memory allocation, dynamic memory allocation allows the allocation and deallocation of memory as needed by a particular software and/or operating system. In one or more embodiments, dynamic memory allocation may lead to memory leaks, memory corruption, buffer overflows and the like. In one or more embodiments, dynamic memory allocation causes other software on a system 600 to depend on one another. In one or more embodiments, static memory allocation may allow for increased security and reliability. In one or more embodiments, each virtual environment 644 may be allocated dedicated private static memory space 648 wherein each dedicated private static memory space 648 includes a partition of memory. In one or more embodiments, each dedicated private static memory space 648 may include a child partition that has been created by the root partition. In one or more embodiments, each dedicated private static memory space 648 may contain its own separate virtual environment 644. In one or more embodiments, creating a separate virtual environment 644 for each of the one or more software may include creating a child partition for each virtual environment 644. In one or more embodiments, dedicated private static memory space 648 may include a guest operating system of virtual environment 644.

With continued reference to FIG. 6, computing device 604 may be configured to create a separate virtual environment 644 for each of the one or more software containers 616 by allocating a dedicated private static memory space 648 as a function of the software data 636, wherein the separate virtual environment 644 comprises a dedicated operating system. In one or more embodiments, software data 636 may contain a required memory space wherein allocating the dedicated private static memory space 648 for each of the one or more software containers 616 as a function of the software data 636 includes allocating the dedicated private static memory space 648 as a function of the required memory space. In one or more embodiments, computing device 604 may allocate dedicated private static memory space 648 based on a required memory space within software data 636. For example, and without limitation, required memory space may include 2 gigabytes wherein computing device 604 may partition memory to create dedicated private memory space 648 containing two gigabytes. In one or more embodiments, computing device 604 may receive software data 636 upon selection of software container 616 wherein computing device 604 may create dedicated private static memory space 648 as a function of software data 636.

With continued reference to FIG. 6, computing device 604 may be configured to allocate a dedicated primary memory space for each virtual environment 644. "Dedicated primary memory space" for the purposes of this disclosure is a portion of a primary memory that is partitioned and reserved for a particular function. For example, and without limitation, computing device 604 may contain 16 gigabytes of random-access memory (RAM) wherein 2 gigabytes of RAM may be reserved and/or dedicated for a particular virtual environment 644 and/or virtual machine 618. In one or more embodiments, primary memory may be partitioned wherein dedicated primary memory space may include one or more partitions. In one or more embodiments, assigning dedicated primary memory space may occur at a software level, wherein a software operating on a host operating system 632 may allocate RAM to each virtual environment 644. In one or more embodiments, allocating and/or assigning dedicated primary memory space may occur on the hardware level wherein hardware virtualization may allow for partitioning of RAM at a hardware level. In one or more embodiments, partitioning on a hardware level may allow for increased safety wherein the RAM partition is not dependent on the vulnerabilities of the operating system. In one or more embodiments, partitioning on a hardware level may allow for increased independence of the virtual environment 644 from the host operating system 632. In one or more embodiments, partitioning RAM at a hardware level may allow for increased independence and isolation from other virtual environments 644. In one or more embodiments, software data 636 may contain resource requirements wherein the resource requirements may contain a particular amount of RAM required for proper execution of software container 616. In one or more embodiments, computing device 604 may be configured to allocate a dedicated primary memory space based on software data 636. In one or more embodiments, computing device 604 may allocate primary memory space using hypervisor 652 wherein RAM may be allocated prior to initialization of the virtual machine 618 and/or virtual environment 644. In one or more embodiments, allocating primary memory space may depend on a DAL level associated with software container 616. In one or more embodiments, a software module 620 within software container 616 having a higher DAL level may receive more RAM whereas a software module 620 associated with a lower DAL level may receive less RAM and/or dedicated primary memory space.

In one or more embodiments, creating virtual environment 644 may further include assigning at least one dedicated processor core 610 to each separate virtual environment 644. In one or more embodiments, processor 608 may include a multi-core processor 608 wherein each virtual environment 644 may be assigned a dedicated processor core 610. A "dedicated processor core" for the purposes of this disclosure is a portion of a multi-core processing component that is reserved exclusively for a particular function. For example, and without limitation, software container 616 may contain a dedicated processor core 610, wherein a single processor core 610 of the multi-core processor 608 may be used exclusively for execution of software container 616. In one or more embodiments, assigning dedicated processor core 610 may allow for independence between two or more virtual environments 644. In one or more embodiments, assigning dedicated processor 608 may allow for minimized communication between two virtual environments 644. In one or more embodiments, assigning dedicated processor core 610 may allow for increased safety wherein failure of a particular processor core 610 and/or virtual environment 644 may be independent of other processor cores 610 and/or virtual environments 644. In one or more embodiments, each software container 616 and/or virtual environment 644 may be assigned at least one dedicated processor core 610. For example, and without limitation, in instances in which 6 virtual environments 644 are created, an 8-core processor 608 may assign one processor core 610 to each virtual environment 644. In one or more embodiments, virtual environments 644 may be assigned additional dedicated processor cores 610 based on software data 636. In one or more embodiments, software data 636 may contain resource requirements indicating the processing power required for software container 616 wherein a particular software container 616 may require more than one processor core 610. In one or more embodiments, assignments of dedicated processor cores 610 may be based on DAL level wherein a software container 616 associated with a higher DAL level may be assigned more than one dedicated processor cores 610. In one or more embodiments, a process of assigning processor cores 610 may be referred to as "CPU pinning". In one or more embodiments, CPU pinning may allow for proper resource allocation wherein a particular software container 616 cannot utilize more resources than it its given. In one or more embodiments, CPU pinning may prevent failures due to multiple software running on similar processor cores 610. In one or more embodiments, CPU pinning may allow for reliable and consistent processing power wherein each virtual environment 644 is given a fixed and independent amount of processing power. In one or more embodiments, computing device 604 may be configured to assigned one or more dedicated processor cores 610 using hypervisor 652. In one or more embodiments, hypervisor 652 may allow for 'pinning' of processor cores 610 to each virtual environment 644, wherein each virtual environment 644 is assigned a dedicated processor core 610. In one or more embodiments, prior to initialization of virtual environment 644, hypervisor 652 and/or computing device 604 may 'pin' and/or assign a dedicated processor core 610 to each virtual machine 618 and/or virtual environment 644.

With continued reference to FIG. 6, computing device 604 may be configured to instantiate hypervisor 652 wherein hypervisor 652 is configured to allocate dedicated private memory space 648, allocate dedicated primary memory space, assign more one or more processors 608 core and the like to virtual machine 618. In one or more embodiments, virtual environment 644 may be created on virtual machine 618 wherein a guest operating system may exist separate and independent from host operating system 632. In one or more embodiments, a virtual template may be used to configure virtual machine 618 and create virtual environment 644 for software container 616. "Virtual template" for the purposes of this disclosure is a list of instructions or code that are configured to automate the creation of a particular virtual environment 644. For example, and without limitation virtual template may contain code configuring computing device 604 to create a virtual machine 618 having dedicated private memory space 648, dedicated primary memory space and/or one or more dedicated processor cores 610, wherein a virtual environment 644 may be created on the virtual machine 618. In one or more embodiments, virtual template may include a single executable file that is configured to allocate physical hardware resources for a virtual machine 618 and initialize a virtual environment 644. In one or more embodiments, virtual template may include pre-defined resource requirements, such as but not limited, predefined amount of dedicated private static memory space 648, predefined amount of processor cores 610, predefined amount of dedicate primary memory space, predefined guest operating system and the like. In one or more embodiments, hypervisor 652 in host operating system 632 may contain command line tools that allow for automating a process in which a virtual environment 644 is created. In one or more embodiments, virtual template may contain instructions in a particular order, wherein a hypervisor 652 may first be instantiated or installed (with predefined settings), the virtual machine 618 is created, resources are allocated for the virtual machine 618, guest operating system is installed on virtual machine 618 to create virtual environment 644 and/or software container 616 is deployed within virtual environment 644. In one or more embodiments, computing device 604 may utilize a script status list to determine if each line of code or instructions were properly executed. "Script status list" for the purposes of this disclosure is information indicating if a proper line of code or instructions within virtual template was properly executed. In one or more embodiments, script status list may return a '0' in instances where the code was properly executed. In one or more embodiments, computing device 604 may be configured to cease execution of following instructions and/or code in instances in which a set of code or instructions had not been properly executed. In one or more embodiments, ceasing execution of virtual script may indicate that a virtual environment 644 may not be stable, and as a result, software module 620 may not be properly executed within virtual environment 644. In one or more embodiments, virtual template may be created using hypervisor 652. In one or more embodiments, virtual template may allow for preconfigured parameters for a virtual environment 644. In one or more embodiments, virtual template may allow for creation of a virtual environment 644 that is exclusive for software container 616. In one or more embodiments, creation of virtual template may allow for removal of unwanted software components that will not be utilized by software module 620. In one or more embodiments, creation of virtual template may allow for creation of a lightweight operating system that contains only the software components that will facilitate the execution of software module 620 and/or software container 616. In one or more embodiments, creation of a lightweight operating system may allow for increased resource allocation wherein guest operating system may utilize less resources such as memory, processing power and the like.

With continued reference to FIG. 6, computing device 604 may be configured to execute software module 620 within virtual environment 644. In one or more embodiments, execution of software module 620 may include the use of container runtime wherein container runtime may manage dependencies such as dedicated software packages 624. In one or more embodiments, container runtime may be configured to ensure that dependencies of software module 620 are taken exclusively from within software container 616 and not form the surrounding operating system and/or virtual environment 644. In one or more embodiments, software module 620 may be executed upon selection of software container 616 within virtual environment 644 by user. In one or more embodiments, selection may include any interaction using one or more input devices as described in this disclosure, such as but not limited to, the clicking of a mouse, the clicking of a keyboard button, and the like. In one or more embodiments, virtual template may include instructions to deploy software module 620 upon creation of virtual environment 644.

With continued reference to FIG. 6, in one or more embodiments, creation of virtual environment 644 may allow for predictable results wherein each iteration may contain the same resource requirements, the same code and the like. In one or more embodiments, virtual environment 644 may be modified following each iteration wherein software components that are not used by software container 616 may be removed to allow for increased resource allocation for software container 616. In one or more embodiments, following each iteration the amount of dedicated primary memory space, dedicated processor cores 610 and/or dedicated private static memory space may change based on resources used in a previous iteration. In one or more embodiments, virtual template may allow for predictable results amongst one or more differing computing devices. In one or more embodiments, virtual template may allow for cloning of a virtual environment 644 containing software container 616, wherein a second virtual template, cloned by virtual template may be used by another individual for similar uses.

With continued reference to FIG. 6, virtual template may include and/or be included within a single executable file. In one or more embodiments, the single executable file may initialize hypervisor 652, create virtual machine 618, allocate resources to the virtual machine 618, install guest operating system on the virtual machine 618 to create virtual environment 644, deploy software container 616 in the virtual machine 618 and within virtual environment 644, install container runtime within virtual environment 644 and/or deploy software container 616 within virtual environment 644. In one or more embodiments, a virtual template may contain a single executable file wherein selection of the single executable file may create virtual machine 618 and deploy software container 616 within virtual environment 644. In one or more embodiments, a plurality of virtual templates may exist wherein selection of each template may cause creation of a particular virtual environment 644 that is exclusively created for a particular software container 616. In one or more embodiments, each of a plurality of software containers 616 may be associated with a particular virtual template. In one or more embodiments, selection of the virtual template may be associated with initialization of a particular software container 616.

With continued reference to FIG. 6, virtual template may include and/or be included in an install script file. "Install script file" for the purposes of this disclosure is an automated script in which one or more processes may occur after installation of a software. For example, and without limitation, install script file may be configured to deploy software container 616 after execution of virtual machine 618 and virtual environment 644. In one or more embodiments, install script file may be generated using an installer on a host operating system 632. In one or more embodiments, installing script file may allow for execution and initiation of multiple software in a single script. For example, and without limitation, installing script file may allow for initialization of hypervisor 652, creation of virtual machine 618, and deployment of software container 616 within virtual machine 618. In one or more embodiments, virtual template may contain a single executable file containing software container 616, virtual environment 644, container runtime, and/or any other data as described in this disclosure that may be used for generation of virtual environment 644 and deployment of software container 616. In one or more embodiments, single executable file may allow for an automated process in which a virtual machine 618 may be created for software module 620. In one or more embodiments, single executable file may allow for decreased risk of human error in the generation of virtual machines 618 and virtual environments 644. In one or more embodiments, virtual template may allow for repeatability and dependency of software module 620 within virtual environment 644.

With continued reference to FIG. 6, in one or more embodiments, hypervisor 652 may include type 1 hypervisor 652 wherein the type 1 hypervisor 652 creates virtualization layer 660 above one or more physical hardware components of computing device 604. In one or more embodiments, virtual template may be configured to interact with hypervisor 652's management tools and/or application program interface. In one or more embodiments, virtual template may interact with hypervisor 652 wherein virtual machine 618 may be created on type 1 hypervisor 652. In one or more embodiments, virtual template may automate the virtual machine 618 making process wherein virtual template may create virtual machine 618 and generate virtual environment 644 containing software container 616 and/or software module 620.

With continued reference to FIG. 6, in one or more embodiments, virtual machine 618 may contain virtual environment 644 wherein software container 616 and/or software module 620 is executed within virtual environment 644. In one or more embodiments, following execution and creation of virtual machine 618, virtual environment 644 and/or software container 616, virtual machine 618 may be packaged for future use. In one or more embodiments, virtual machine 618 may be packaged to include virtual environment 644 and/or any information contained within virtual environments 644, such as but not limited to, software container 616 and data produced by software container 616. In one or more embodiments, hypervisor 652 may allow for generation of a virtual package. "Virtual package" for the purposes of this disclosure is a virtual machine 618, containing a generated environment including information within the virtual environment 644. For example, and without limitation "Virtual package" may include virtual machine 618, having information indicating dedicated private static memory space 648, dedicated processor cores 610, dedicated primary memory space and the like. In one or more embodiments, virtual package may include virtual machine 618 that has been created for initialization and/or deployment of software container 616. In one or more embodiments, virtual package may contain open virtualization format (OVF), virtual hard disk (VHD) and/or any other format that may allow for portability of virtual machine 618 wherein virtual package may be instantiated on more than one computing devices. In one or more embodiments, virtual package may include an already installed operating system containing software module 620. In one or more embodiments, upon termination of use of software module 620, virtual machine 618 may be saved in an OVF format wherein virtual machine 618 may be instantiated on differing devices. In one or more embodiments, hypervisor 652 may contain one or more features configured to allow for export of virtual machine 618 and/or a cloning of virtual machine 618 wherein virtual machine 618 and all of its components may be packaged into a single file. In one or more embodiments, virtual package may be deployed one or more computing devices. In one or more embodiments, virtual package contain an OVF format wherein virtual package may be deployed on a type 1 hypervisor 652 and/or type 2 hypervisor 652. In one or more embodiments, virtual package may include virtual machine 618 metadata wherein virtual machine 618 metadata may include information such as but not limited to, virtual hardware (e.g. dedicated private static memory space 648, dedicate processor 608, etc.), various virtual machine 618 settings and the like. In one or more embodiments, virtual package may be generated as a function of virtual template wherein virtual template may create virtual machine 618, generate virtual environment 644 and deploy software container 616 and wherein the virtual machine 618 may be packaged as a virtual package. In one or more embodiments, virtual package may allow for portability of software module 620 wherein any computing device 104 containing hypervisor 152 may be used to execute virtual package. In one or more embodiments, virtual package may be cloned for use on one or more computing devise. In one or more embodiments, virtual package may serve as an operating system configured solely for software container 616. In one or more embodiments, virtual package may be deployed on type 1 hypervisor 652 and/or type 2 hypervisor 652 depending on the importance and safety of software module 620.

With continued reference to FIG. 6, in one or more embodiments, virtual package may be generated on host operating system 632. In one or more embodiments, type 2 hypervisor 652 may exist on host operating system 632 wherein virtual template may be configured to generate virtual package using type 2 hypervisor 652. In one or more embodiments, virtual package may then be saved in an OVF format and used in in the future with type 1 hypervisor 652. In one or more embodiments, virtual package may include various network settings, various security setting, various data saved on virtual machine 618 and the like. In one or more embodiments, virtual package may be continuously modified and/or updated. In one or more embodiments, virtual package may allow for interaction of software module 620, wherein data generated from software module 620 and/or modifications made to software module 620 may be saved for future iterations. In one or more embodiments, virtual package may be imported into more than one hypervisor 652s. In one or more embodiments, virtual package may allow for portability of software module 620, wherein software module 620 and/or any generated data may be executed on any machine containing hypervisor 652. In one or more embodiments, computing device 604 may contain a plurality of virtual packages, wherein each virtual package may contain a separate virtual machine 618 virtual environment 644 and/or software container 616. In one or more embodiments, selection of one or more virtual packages may allow for execution of one or more virtual environments 644. In one or more embodiments, virtual package may allow for repeatability and reliability of software module 620. In one or more embodiments, virtual package may be placed on a portable hard storage device, transmitted to a database and the like for future access.

With continued reference to FIG. 6, In one or more embodiments, software container 616, virtual template and/or virtual package may include a reusable software component (RSC). "Reusable software component" for the purposes of this disclosure is a software that has been pre-tested and has been certified to be used multiple times and on multiple systems. For example, and without limitation, software container 616 may include RSC wherein software container 616 may be reused on differing operating systems and has been tested multiple times. In one or more embodiments, an RSC may allow for efficiency and consistency wherein software that has been proven to work may be duplicated and/or used on multiple differing systems and/or operating systems. In one or more embodiments, a piece of software may be created as an independent component and then labeled as an RSC following testing of the software. In one or more embodiments, RSC may include a software that has been tested by various aviation and/or military authorities and has been validated and/or certified for reuse. In one or more embodiments, a unit of software can be developed initially as an independent component. Software units developed as independent software components specifically for reuse and then airworthiness qualified as part of a system 600 can be endorsed by the cognizant airworthiness authority as reusable for subsequent systems. The scenarios for reuse may dictate the amount of credit that will be allowed by the airworthiness authority. Any of the software life cycle artifacts (such as requirements specifications, design documents, test reports, source code, or any other life cycle artifacts supporting software qualification), can be developed for reuse, if those artifacts are initially developed specifically for the software unit separate from the artifacts for the initial system 600 the software unit and/or software module 620 is first qualified with. Purchase of software "off the shelf" does not necessarily mean that software carries any airworthiness pedigree, nor does it infer that the proper documentation for reuse exists. Some do, and these do offer documentation, so this characterization of software overlaps that of the RSC. In one or more embodiments, software container 616, virtual template and/or virtual package may be certified for reuse, wherein software container 616, virtual template and/or virtual package may be relied upon to perform the same functions with the same reliability and consistency in every iteration.

With continued reference to FIG. 6, in one or more embodiments, virtual machine 618 and/or virtual environment 644 may exist wherein virtual environment 644 may contain an operating system ready to deploy software container 616. In one or more embodiments, an already existing virtual machine 618 and/or virtual machine 618 may be contained within virtual package wherein virtual package contains virtual environment 644 having solely an operating system. In one or more embodiments, software container 616 may be deployed to virtual environment 644 wherein virtual package may be instantiated and software container 616 may be deployed to virtual environment 644. In one or more embodiments, virtual packages containing virtual machines 618 and virtual environments 644 for each software container 616 may cause increased storage usage and decreased portability. In one or more embodiments, one or more virtual packages may be created, wherein each virtual package contains virtual machine 618 with predefined resources allocated and an already generated virtual environment 644. In one or more embodiments, one or more virtual package may be instantiated wherein one or more software containers 616 may be deployed within virtual environment 644. In one or more embodiments, software container 616 may be deployed on virtual environment 644. In one or more embodiments, following termination of software module 620 within virtual environment 644, software container 616 may be removed. In one or more embodiments, software container 616 may allow for containment of software module 620 wherein software container 616 does not rely on the operating system within virtual environment 644. In one or more embodiments, upon termination of software module 620, data generated within software module 620 may be contained within software container 616. In one or more embodiments, virtual package may include a bare operating system in which software container 616 may not affect various systems and settings on the operating system. In one or more embodiments, a user may select from a plurality of preconfigured virtual packages wherein, each preconfigured virtual package may contain a pre-installed operating system, pre-installed container runtime, reconfigured resources allocated and the like. In one or more embodiments, plurality of virtual packages may allow for differing virtual environments 644 that suited to differing software containers 616. For example, and without limitation, a first virtual package may contain 2 gigabytes of allocated resources, whereas a second virtual environment 644 may contain 4 gigabytes of allocated resources. In one or more embodiments, system 600 may include a virtual machine 618 container. "Virtual machine container" for the purposes of this disclosure is a preconfigured machine having a preconfigured operating system installed. In one or more embodiments, virtual machine 618 container may be compared to a newly installed operating system wherein the operating system on a computing device 604. In one or more embodiments, virtual machine 618 container may be configured to deploy software containers 616 in a separate environment from the host operating system 632. In one or more embodiments, software containers 616 deployed within virtual machine 618 container may not affect systems, settings and the like within virtual machine 618 container, wherein virtual machine 618 container may be used for a plurality of software containers 616. In one or more embodiments, virtual machine 618 container may be cloned to allow for multiple software containers 616 to be deployed within multiple virtual machine 618 containers. In one or more embodiments, virtual machine 618 containers may contain operating systems in which software, data and/or settings remain consistent and unchanged allowing for increased repeatability. In one or more embodiments, virtual machine 618 container may contain an OVF format and be used similarly to virtual package.

With continued reference to FIG. 6, in one or more embodiments, virtual package and/or virtual container may be instantiated directly on hypervisor 652. In one or more embodiments, host operating system 632 may exist on computing device 604, wherein virtual package and/or virtual container may be instantiated through host operating system 632. In one or more embodiments, virtual package and/or virtual container running atop type 1 hypervisor 652 may be accessed through remote software such as but not limited to remote desktop software, a console such as a hypervisor 652 console, a secure shell (SSH), A virtual network software (VNC) and the like. In one or more embodiments, one or more virtual machines 618 may be accessed from host operating system 632 while still allowing for the virtual machines 618 to run atop type 1 hypervisor 652. In one or more embodiments, remote software may allow for initialization of a virtual environment 644 through host operating system 632. In one or more embodiments, remote software may allow for independence between host operating system 632 and virtual environment 644 while still allowing for access to virtual environment 644. In one or more embodiments, remote software may allow for access to multiple virtual environments 644 wherein multiple virtual environments 644 may be displayed on a single display device.

An apparatus, method, or software described herein may be consistent with any apparatus, method, or software disclosed in U.S. patent application Ser. No. 18/395,149, filed on Dec. 22, 2023, and titled "APPARATUS AND METHOD FOR PROVIDING A SAFETY-CRITICAL OPERATING ENVIRONMENT (SCOE)," U.S. patent application Ser. No. 18/395,210, filed on Dec. 22, 2023, and titled "SYSTEM AND METHOD FOR A SAFETY CRITICAL OPERATING ENVIRONMENT CONTAINER ARCHITECTURE," the entirety of each of which is hereby incorporated by reference.

Figure 7:
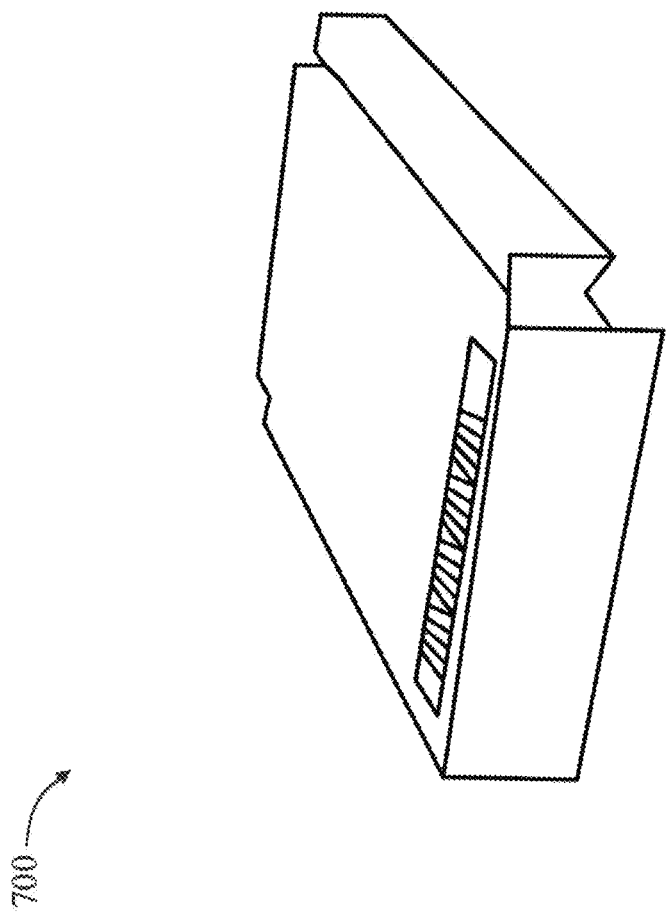
FIG. 7 is a schematic diagram showing an exemplary embodiment of a housing.

Referring now to FIG. 7, apparatus may include and/or components thereof be incorporated in a housing. Housing 700 may be composed of any suitable material or combination of materials, including without limitation metal such as steel, aluminum, titanium or the like, natural and/or artificial polymer materials such as plastic and/or rubbers, or the like. Housing 700 may be anodized, coated by processes such as spray coating, power coating, electroplating, or the like, and/or otherwise subjected to any suitable surface treatment. In some embodiments, housing 700 may include one or more heat transfer elements (not shown) including without limitation a heat pipe and/or one more thermally conductive elements running from circuit elements of apparatus 100 to edges thereof and/or to a computing device to which apparatus 100 is electrically and/or communicatively connected as described above; such computing device may thermally conduct heat away from housing 700 and/or apparatus 100 and/or dispose of such heat using cooling systems of such device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hardware apparatus for heterogenous processing, the apparatus comprising:
   a graphics processing unit comprising a first dedicated memory and a first plurality of processing cores;
   a central processing unit comprising a second dedicated memory and a second plurality of processing cores;
   a field programmable gate array comprising a third dedicated memory;
   a control and data bus assembly connecting the field programmable gate array, the central processing unit, and the graphics processing unit, wherein the field programmable gate array, the central processing unit, and the graphics processing unit are configured to interact using the control and data bus assembly and an application program interface configured to allow the same code to run on the field programmable gate array, the central processing unit, and the graphics processing unit;
   a virtual path cross-connect interface component;
   wherein the hardware apparatus is configured to:
      receive a program instruction set; and
      allocate a first processing core from the first plurality of processing cores and a second processing core from the second plurality of processing cores to the program instruction set.

2. The hardware apparatus of claim 1, wherein the application program interface is configured to enable the division of processing tasks between the field programmable gate array, the central processing unit, and the graphics processing unit.

3. The hardware apparatus of claim 1, wherein each of the field programmable gate array, the central processing unit, and the graphics processing unit is configured to allow architecture-specific code to run.

4. The hardware apparatus of claim 1, wherein the hardware apparatus is not separated using a virtual machine or a partition.

5. The hardware apparatus of claim 1, wherein each of the graphics processing unit, the central processing unit, and the field programmable gate array can access data stored on each of the first dedicated memory, the second first dedicated memory, and the third first dedicated memory.

6. The hardware apparatus of claim 1, wherein the central processing unit comprises a reduced instruction set computer.

7. The hardware apparatus of claim 1, wherein the central processing unit comprises 72-bit memory with error correction codes.

8. The hardware apparatus of claim 1, wherein the central processing unit comprises 16 72-bit central processing unit cores, each configured to support 64 byte lines, and each comprising error correction code memory.

9. The hardware apparatus of claim 1, further comprising a field programmable gate array mezzanine card communicatively connected to the field programmable gate array.

10. The hardware apparatus of claim 1, wherein the hardware apparatus is communicatively connected to an external computing device using the virtual path cross-connect interface component.

11. The hardware apparatus of claim 10, wherein the hardware apparatus is configured to receive the program instruction set from the external computing device.

12. The hardware apparatus of claim 1, wherein the program instruction set is stored in persistent memory of the hardware apparatus.

13. The hardware apparatus of claim 1, wherein the hardware apparatus is communicatively connected to an external display using the field programmable gate array mezzanine card.

14. The hardware apparatus of claim 1, wherein the hardware apparatus is further configured to allocate a first memory component from the first memory and a second memory component from the second memory to the program instruction set.

15. The hardware apparatus of claim 1, wherein the hardware apparatus is partitioned such that the first processing core and the second processing core are separated from at least one program operating on a separate partition.

16. The hardware apparatus of claim 1, wherein the first processing core and the second processing core are separated from at least one program through use of a virtual machine.

17. The hardware apparatus of claim 16, further comprising a hypervisor, wherein the hypervisor is configured to create and manage virtual machines.

18. The hardware apparatus of claim 1, wherein the first dedicated memory, the second dedicated memory, and the third dedicated memory each comprise persistent memory.

19. The hardware apparatus of claim 1, wherein the central processing unit comprises a fourth dedicated memory.

20. The hardware apparatus of claim 1, wherein the field programmable gate array comprises a fifth dedicated memory.

* * * * *